United States Patent [19]

Mihara

[11] Patent Number: 4,969,721
[45] Date of Patent: Nov. 13, 1990

[54] ZOOM LENS SYSTEM

[75] Inventor: Shinichi Mihara, Tokyo, Japan

[73] Assignee: Olympus Optical Co., Ltd., Tokyo, Japan

[21] Appl. No.: 403,394

[22] Filed: Sep. 6, 1989

[30] Foreign Application Priority Data

Sep. 7, 1988 [JP] Japan .................................. 63-222214
Nov. 22, 1988 [JP] Japan .................................. 63-293524
Mar. 9, 1989 [JP] Japan ...................................... 1-59317

[51] Int. Cl.⁵ ............................................. G02B 15/14
[52] U.S. Cl. ..................................................... 350/427
[58] Field of Search ................................ 350/423, 427

[56] References Cited

U.S. PATENT DOCUMENTS 4,690,513 9/1987 Takahashi et al. .................. 350/427
4,770,510 9/1988 Mukaiya ............................... 350/427

FOREIGN PATENT DOCUMENTS 60-123817 7/1985 Japan .
62-247318 10/1987 Japan .
63-287810 11/1988 Japan .

Primary Examiner—Scott J. Sugarman
Attorney, Agent, or Firm—Cushman, Darby & Cushman

[57] ABSTRACT

A compact zoom lens system having a field angle on the order of 48° at the wide position thereof, vari-focal ratios of 3 to 6, aperture ratios of F/1.4 to F/2.8 and a long back focal length. Said zoom lens system comprises, in the order from the object side, a first lens unit having positive refractive power, a second lens unit movable for varying focal length and having negative refractive power, a third lens unit movable along the optical axis for varying focal length and having positive refractive power, and a fourth lens unit always kept fixing and having positive refractive power, the second lens unit and the third lens unit consisting of four or a smaller number of lens elements in total.

8 Claims, 30 Drawing Sheets

FIG. 1
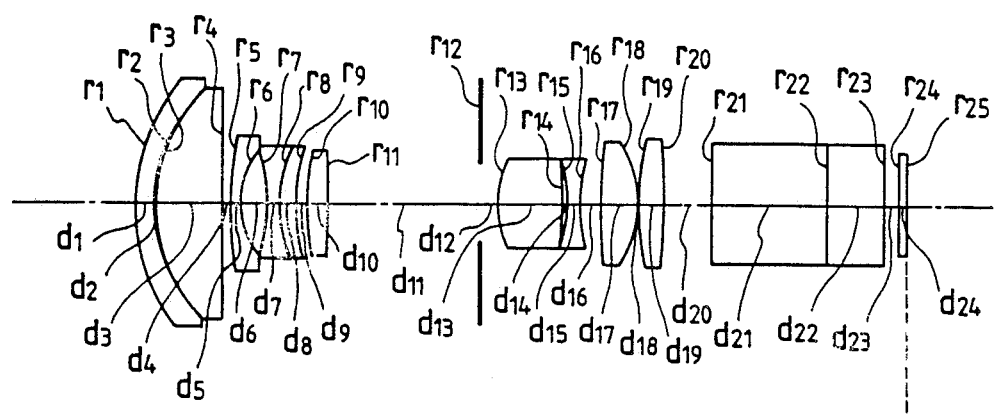
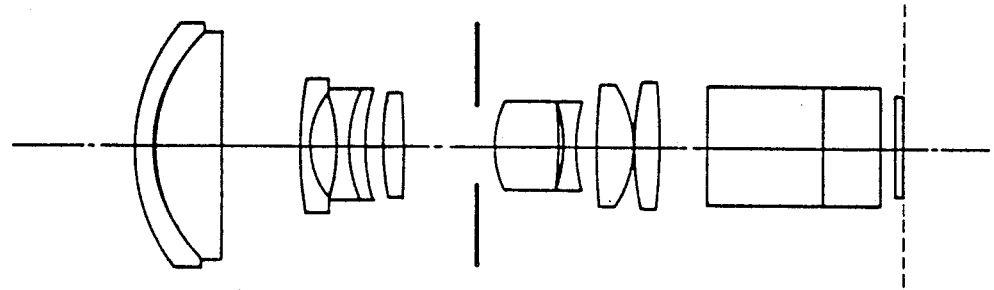
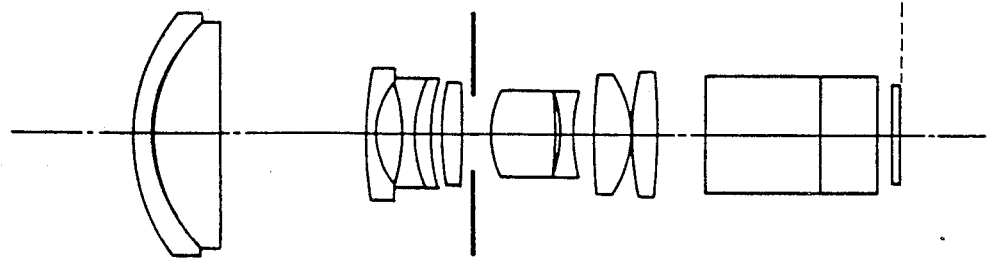

FIG. 2
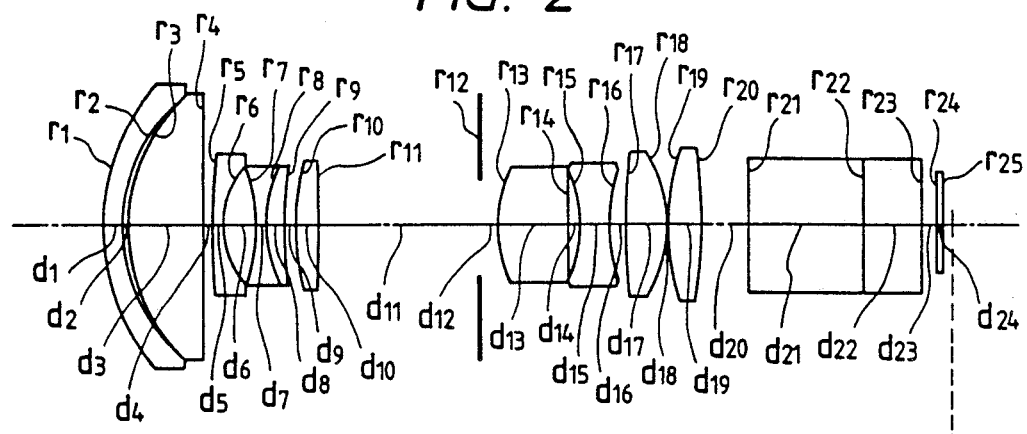
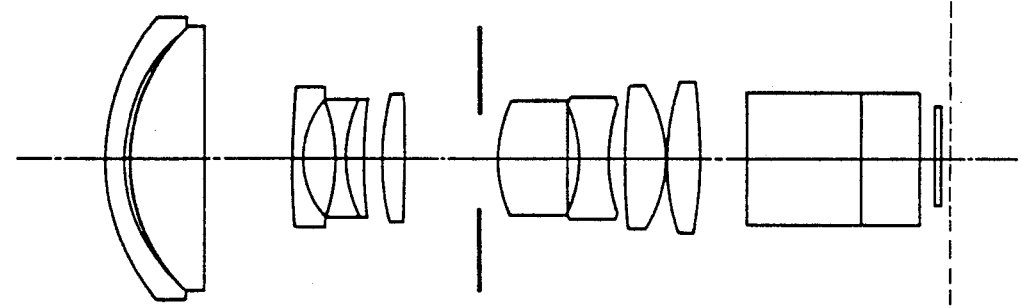
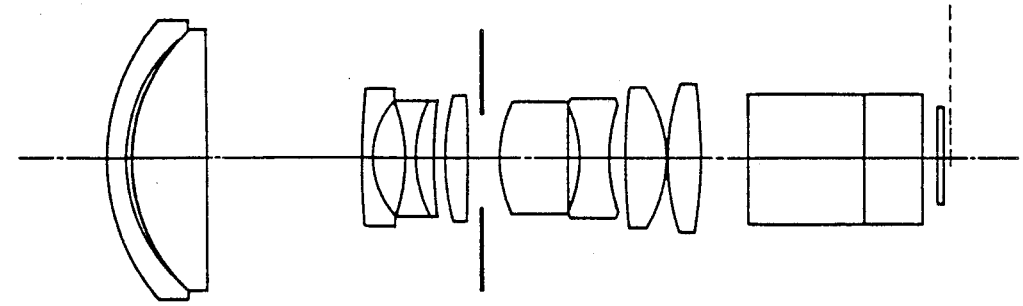

FIG. 9
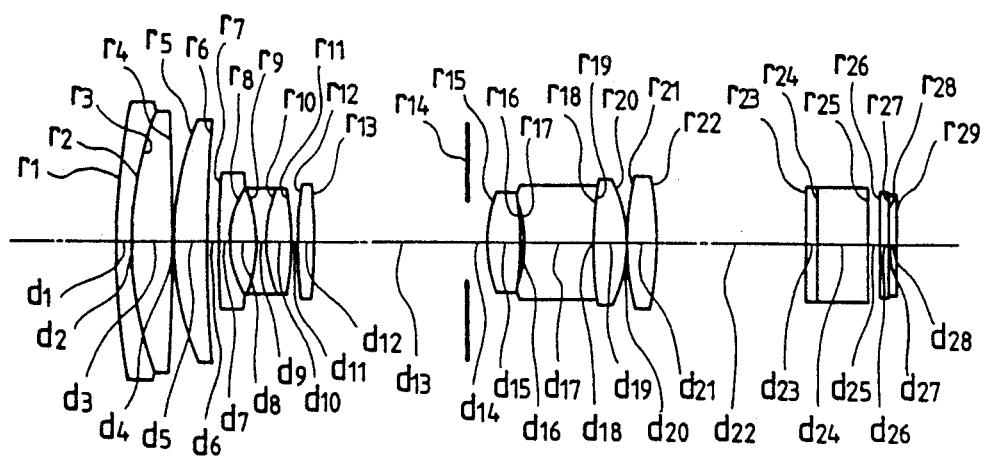
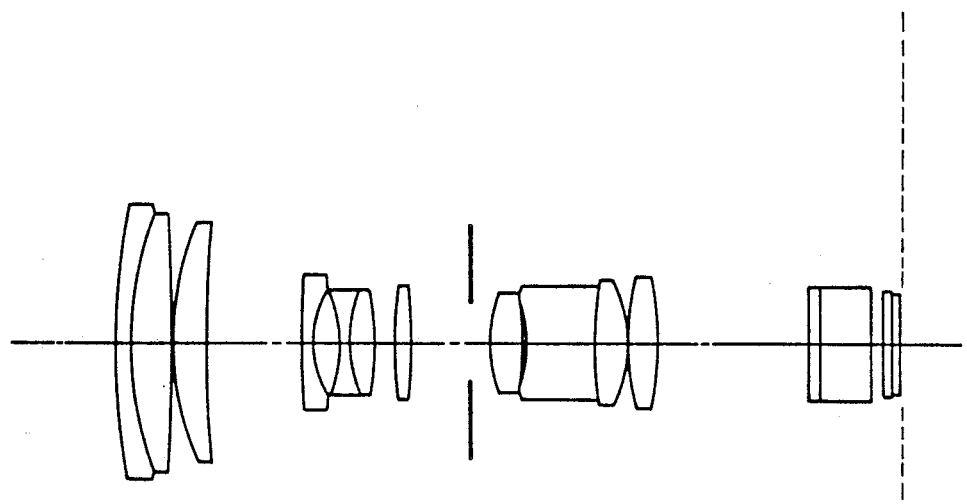
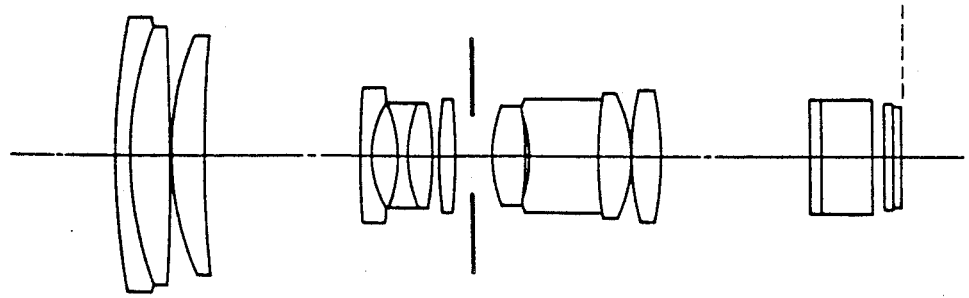

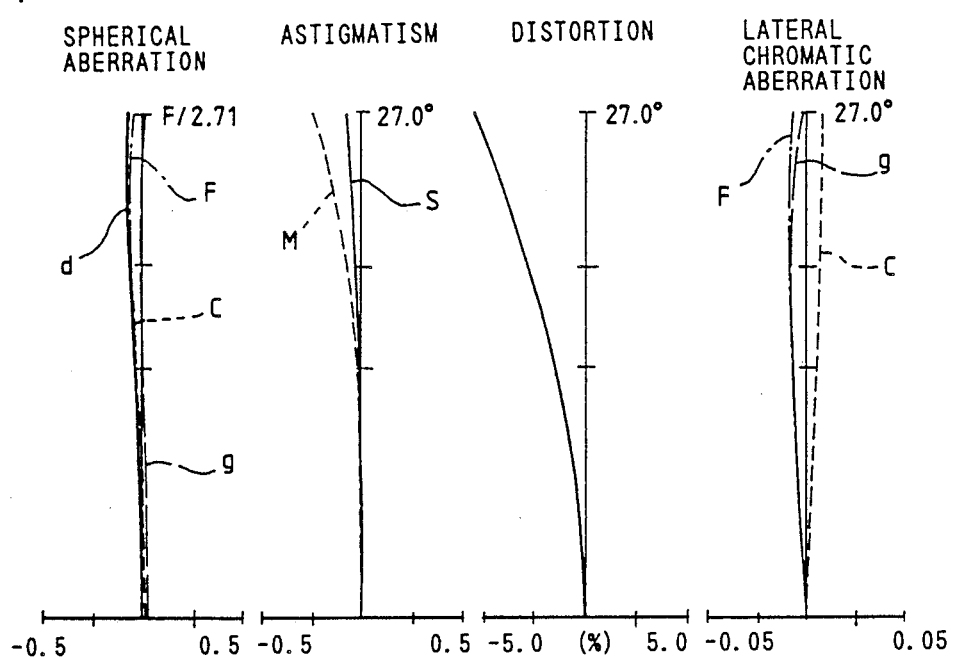
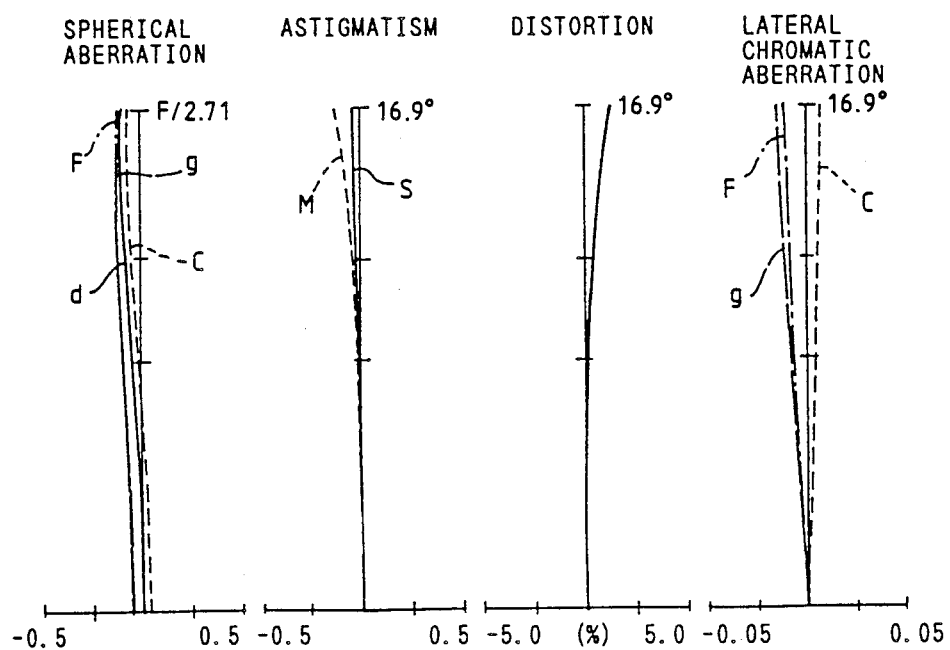

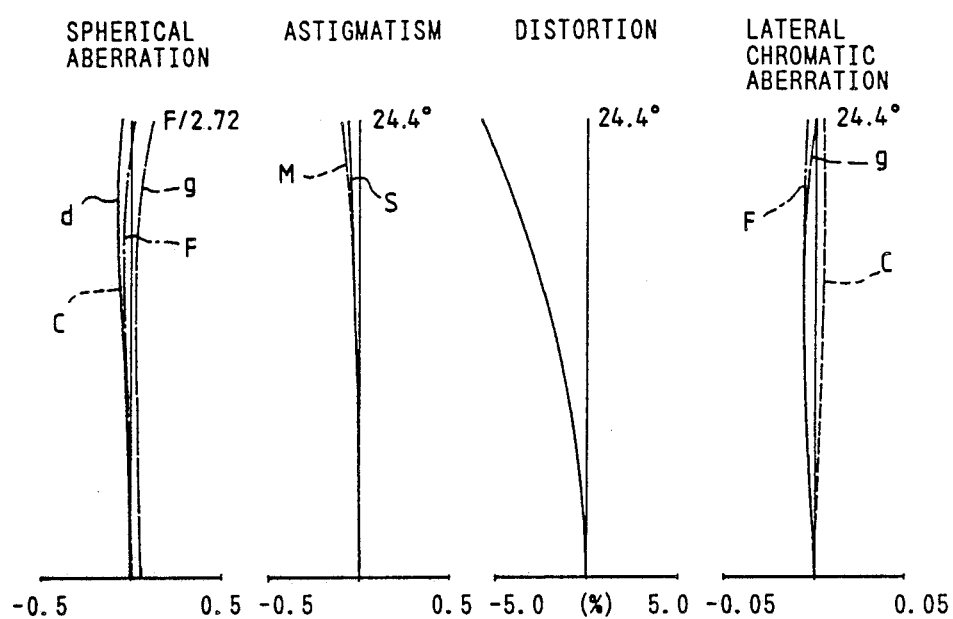
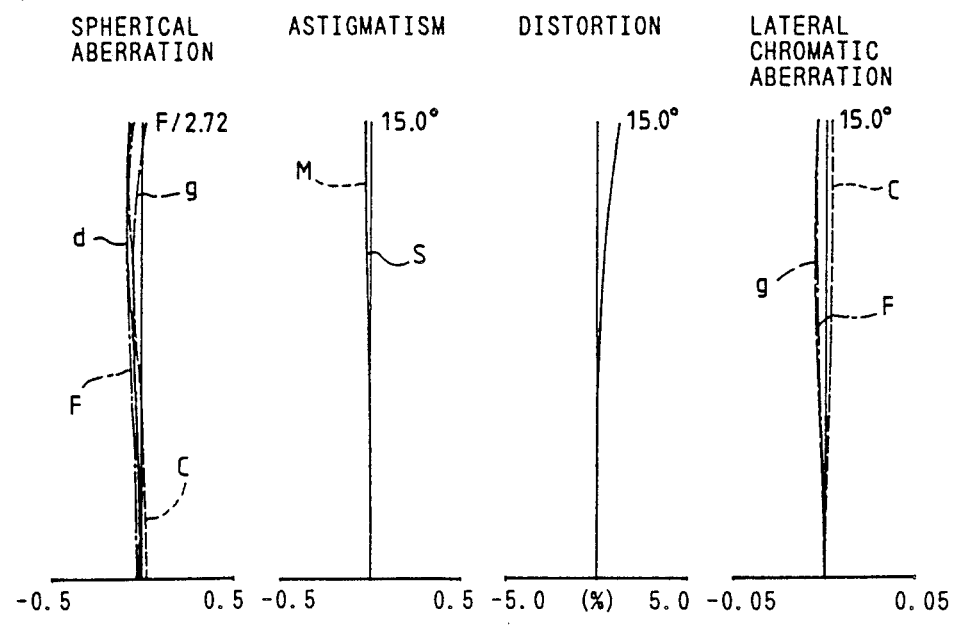

ZOOM LENS SYSTEM

BACKGROUND OF THE INVENTION (a) Field of the invention:

The present invention relates to a photographic zoom lens system and more specifically to a zoom lens system suited for use with photographic cameras using electronic image pickup tubes and solid-state image pickup devices as the image sensors.

(b) Description of the prior art:

The lens systems intended for use with photographic cameras using the electronic image pickup tubes and solid-state image pickup devices as the image sensors are designed mostly as zoom lens systems. Most of these zoom lens systems have aperture ratios of at least F/2.8 and zooming ratios of at least 3.

These zoom lens systems have the high aperture ratios and high vari-focal ratios, but comprise lens elements in a number as large as 13 to 15 and require high manufacturing costs.

As zoom lens systems of this type, lens systems have recently been disclosed by Japanese Unexamined Published Patents Application No. 123817/60 and No. 247318/62. Each of these zoom lens systems comprises 12 to 18 lens elements. Out of these lens systems, the zoom lens system disclosed by Japanese Unexamined Published Patent Application No. 247318/62 has a fundamental composition consisting, in the order from the object side, a first lens unit which has positive refractive power and is held stationary for varing focal length but movable for focusing, a second lens unit which has negative refractive power and is movable for varying focal length, a third lens unit which has positive refractive power and is moved along a locus convex on the image side for correcting positional deviation of the image surface caused by variation of focal length, and a fourth lens unit which has an imaging function and is always kept fixed. This conventional example consists of 11 lens elements in total. Speaking concretely, it comprises three lens elements in the first lens unit, three lens elements in the second lens unit, one lens element in the third lens unit and four lens elements in the fourth lens unit. This lens system consists of lens elements in a number smaller than those of the lens elements used in the other conventional zoom lens systems.

There has recently been disclosed a zoom lens system consisting of a smaller number of lens elements, concretely nine lens elements. This zoom lens system was disclosed by Japanese Unexamined Published Patent Application No. 287810/63, has lighter weight and compacter design, a back focal length long for the focal length thereof, concretely an optical path length of back focal length 1.05 times as long as the geometrical mean of the focal length of the zoom lens system as a whole at the wide position thereof and the focal length of the zoom lens system as a whole at the tele position thereof, and permits various types of optical members to be inserted between the zoom lens system and the image surface thereof.

The above-described conventional zoom lens system has field angles of 45.5° to 16.2°, a vari-focal ratio of 3 and an aperture ratio of F/1.4, but the zoom lens system comprises a first lens unit having a large diameter and thickness, and it cannot be said that the zoom lens system is sufficiently compact among the zoom lens systems of the similar type. Especially when the zoom lens system is combined with an electric focusing mechanism for performing automatic focusing, for example, the zoom lens system has a defect that it consumes power at a high rate and does not permit accelerating focusing speed.

Further, for designing a viewfinder optical system for single-lens reflex cameras, a relatively wide space is necessary between the zoom lens system and the image surface thereof for arranging a light splitting mirror for leading light into the viewfinder optical system. Especially when the light-splitting mirror is designed as a quick return mirror or a plate mirror, a wider space is required. The zoom lens system disclosed by Japanese Unexamined Published Patent Application No. 287810/63 is insufficient in width of the space described above.

SUMMARY OF THE INVENTION

A primary object of the present invention is to provide a compact zoom lens system wherein a lens unit arranged on the extremely object side (a first lens unit) has a small outside diameter.

Another object of the present invention is to provide a zoom lens system having an optical path length of back focal length of at least 1.2 times as long as the geometrical mean of the focal length of the zoom lens system as a whole at the wide position thereof and the focal length of the zoom lens, system as a whole at the tele position thereof.

A third object of the present invention is to provide a zoom lens system having a field angle on the order of 48° at the wide position thereof, a vari-focal ratio of 3.6, an aperture ratio on the order of F/1.4 to F/2.8 and favorable imaging performance.

A fourth object of the present invention is to provide a zoom lens system comprising a small number of lens elements in total.

The zoom lens system according to the present invention consists, in the order from the object side, a first lens unit having positive refractive power, a second lens unit movable along the optical axis for varying focal length and having negative refractive power, a third lens unit movable along the optical axis for varying focal length and having positive refractive power, and a fourth lens unit always kept fixed and having positive refractive power, said second and third lens units consisting of four or a smaller number of lens elements. Further, the zoom lens system according to the present invention is so designed as to satisfy the following condition (1):

$$0.2 < |\uparrow \beta_{2s}| < 0.8 \text{ tm (1)}$$

wherein the reference symbol $\beta_{2s}$ represents magnification of the second lens unit when the zoom lens system as a whole is set at a focal length of $fs = fw \cdot f_T$ (the reference symbols fw and $f_T$ represent focal lengths at the wide position and the tele position respectively).

The zoom lens system disclosed by Japanese Unexamined Published Patent Application No. 247318/62, for example, reserves separate spaces for shifting the second lens unit and the third lens unit respectively, thereby requiring a wider space in total. Further, it is convenient for mechanical structure to design a zoom lens system so as to locate these movable lens units on the same side with regard to an aperture stop. For this reason, the aperture stop is located on the image side of the third lens unit. Accordingly, the entrance pupil of the zoom lens system is apt to be located farther from the first surface of the zoom lens system. Therefore, the offaxial ray passes through a high portion of the first lens unit and light quantity becomes insufficient when the first lens unit does not have a large diameter. It is therefore obliged to design the first lens unit so as to have a large diameter. When the first lens unit has a large diameter as described above and has a convex shape, it is obliged to design the first lens unit as a thick lens for reserving sufficient thickness at the marginal portion thereof. Accordingly, there is caused a vicious circle to locate the entrance pupil farther from the first surface, thereby enlarging the diameter of the front lens.

By selecting such a refractive power distribution as to overlap, for a distance as long as possible, the spaces for shifting the second lens unit and the third lens unit while avoiding interference between these the lens units, the present invention has succeeded in shortening the space for shifting the lens units in total and locating the entrance pupil of the zoom lens system as a whole near the first surface thereof. Speaking concretely, the third lens unit is moved in conjunction with the motion of the second lens unit and it is desirable to shift the third lens unit as far as possible toward the image side at the tele position where the second lens unit is shifted farthest toward the image side. The above-mentioned condition (1) is necessary to move the second and the third lens units as described above. In other words, by limiting the magnification $\beta_{2s}$ of the second lens unit within the range defined by the condition (1) at an intermediate focal length of $f_s$, it is possible to satisfy the above-described requirement for the motion of the third lens unit relative to the second lens unit and prevent diameter of the front lens from being enlarged.

If $|\beta_{2s}|$ has a value larger than the upper limit of 0.8 of the condition (1), the second lens unit and the third lens unit cannot have a common shifting space as in the case of the above-described conventional example, whereby the front lens will inevitably have a large diameter. If $|\beta_{2s}|$ has a value smaller than the lower limit of 0.2 of the condition (1), in contrast, the second lens unit will mechanically interfere with the third lens unit at the wide position. When the zoom lens system is so designed as to prevent such interference, the second lens unit will be located apart from the third lens unit at the tele position, thereby producing a useless space in the zoom lens system and enlarging diameter of the front lens.

In addition, it is advantageous for reducing diameter of the front lens to compose the second lens unit and the third lens unit of four or a smaller number of lens elements in total. Speaking concretely, it is preferable to compose the second lens unit of a negative lens element, a negative lens element and a positive lens element in the order from the object side, and the third lens unit of a single positive lens element, or to compose the second lens unit of two negative lens elements, and the third lens unit of a positive lens element and a negative lens element (or a single lens element) in the order from the object side.

In order to accomplish the objects of the present invention, it is desirable to design the zoom lens system so as to satisfy the following conditions (2) through (4):

$$1.0 < |f_{II\ III}|/f_w < 2.2 \quad (2)$$

$$\nu_{3p} < 63 \quad (3)$$

$$-0.06 < (D_2w - D_2T)/f_s < 0.16 \quad (4)$$

wherein the reference symbol $f_{II\ III}$ represents a total focal length of the second lens unit and the third lens unit as a whole, the reference symbol $\nu_{3p}$ designates Abbe's number of the positive lens element arranged in the third lens unit, and the reference symbols $D_2w$ and $D_2T$ denote the airspaces reserved between the second lens unit and the third lens unit at the wide position and the tele position respectively.

When the third lens unit is shifted in the manner like that in the zoom lens system according to the present invention, the third lens unit functions to cancel the focal length varying function of the second lens unit. Accordingly, the second lens unit is shifted for a distance longer than that in the conventional zoom lens system. Therefore, the zoom lens system according to the present invention requires a longer shifting space and makes it hard to reduce diameter of the front lens. In order to correct this defect or make the shifting distance for the second lens unit as short as the shifting distances in the conventional zoom lens system, the condition (2) has been adopted.

If the upper limit of 2.2 of the condition (2) is exceeded, the second lens unit must be shifted for a long distance, thereby making it necessary to enlarge diameter of the front lens. If the lower limit of 1.0 of the condition (2) is exceeded, in contrast, spherical aberration and coma will tend to be varied remarkably by varying focal length, thereby making it impossible to enhance vari-focal ratio.

As for the chromatic aberration, it is unnecessary to reduce it sufficiently in the second lens unit and the third lens unit respectively since the airspace reserved between these lens unit is not varied so remarkably. The chromatic aberration can be corrected favorably by cancelling the chromatic aberration produced by the second lens unit with that produced by the third lens unit. When the zoom lens system according to the present invention is so designed as to satisfy the condition (2), it is impossible to cancel the chromatic aberration by using a material having a large Abbe's number for the positive lens element in the third lens unit as is the case of the conventional zoom lens system. For this reason, the present invention uses a medium of $\nu_{3p} < 63$ for the positive lens element in the third lens unit as defined by the condition (3). If the upper limit of the condition (3) is exceeded, the chromatic aberration will easily be varied remarkably by varying focal length.

So far as the airspace reserved between the second lens unit and the third lens unit is narrow, the chromatic aberration is varied little. Accordingly, the condition (4) has been adopted.

If the upper limit of 0.16 of the condition (4) is exceeded, the chromatic aberration will be varied remarkably by varying focal length. If the lower limit of $-0.06$ of the condition (4) is exceeded, in contrast, the airspace reserved between the second lens unit and the third lens unit is broardened, thereby producing a useless space and inconvenience for reducing diameter of the front lens.

In addition, $(D_2w - D_2T) = 0$ is most desirable for designing the zoom lens system according to the present invention.

Furthermore, the condition (4) is preferable also for satisfying the condition (1) at a high vari-focal ratio.

When the third lens unit as a whole has too strong a power in the zoom lens system according to the present invention, it is difficult from the viewpoint of manufacturing precision to limit within a certain definite range the deviation of the image surface caused by zooming. For this reason, it is desirable to select the focal length $f_{III}$ of the third lens unit within the range defined by the following condition (5):

$$1.4 < f_{III}/\sqrt{f_W \cdot f_T} < 3.5 \qquad (5).$$

If the lower limit of the condition (5) is exceeded, it is difficult from the viewpoint of manufacturing precision to limit within an allowable range the deviation of the image surface caused by zooming. If the upper limit of the condition (5) is exceeded, in contrast, the shifting distance of the third lens unit relative to the second lens unit will be too long, thereby producing undesirable or useless shifting space.

In the present invention, the fourth lens unit is composed of three or four lens elements for designing a zoom lens system having an aperture ratio on the order of F/2.8, of four or five lens elements for designing a zoom lens system having an aperture ratio on the order of F/2.0, or four to six lens elements for designing a zoom lens system having an aperture ratio on the order of F/1.4. For the purpose of reducing the number of the lens elements arranged in the fourth lens unit and in view of the fact that the fourth lens unit is an imaging optical system, it is preferable to design the fourth lens unit as the triplet type. Further, it is preferable for correcting aberrations to compose some or all of the first positive lens component, the negative lens component and the second positive lens component in the triplet type lens unit of a plural number of lens elements, or to use aspherical surfaces thereon.

When the number of lens elements composing the fixed lens unit is reduced to a threshold, especially coma is aggravated. This is because the offaxial upper ray is strongly converged by the fixed lens unit (the fourth lens unit) and the longitudinal aberration produced by the lens unit has a large negative value. Further, when the F number of the zoom lens system is reduced for obtaining a brighter image, it becomes difficult to correct spherical aberration and coma in the lens system.

In view of the facts described above, it is preferable for obtaining a zoom lens system having an aperture ratio on the order of F/2.8 to design the fourth lens unit as the triplet type and adopt aspherical surfaces as some of the surfaces on the second positive lens component or to compose the second positive lens component of two lens elements in the triplet type. The reason for adopting the aspherical surfaces on the second positive lens component or composing the second positive lens component of two lens elements as described above is that the spherical aberration and coma can be corrected separately since the light bundles are overlapped a little with one another at each image height on the second positive lens component.

In case of a zoom lens system having an aperture ratio on the order of F/2.0 or F/1.4, it is possible to correct the chromatic aberration and coma by composing the first positive lens component of one or two lens elements, the negative lens component of one or two lens elements, and the second positive lens component of two or three lens elements. In order to correct the aberrations more favorably, it is preferable to use aspherical surfaces as some of the surfaces on the positive lens components, especially on the second positive lens component, or add a negative lens element strongly concave on the object side at a location on the image side of the second positive lens component, and such a design can improve the imaging performance of the zoom lens system.

In addition, when the zoom lens system uses the aspherical surfaces, it is undesirable to adopt the method to correct the aberrations produced by a certain lens element by another lens element since such a method allows the aberrations to be remarkably influenced by eccentricity. It is therefore preferable to use the aspherical surfaces on the lens elements which produce remarkable aberrations so that the production of the aberrations are moderated. Accordingly, the longitudical aberration having the large negative value of the upper ray can be moderated by using, on the second positive lens component producing remarkable coma, an aspherical surface having refractive power which becomes weaker toward the marginal portions than that of the spherical surface having the same curvature as that of the aspherical surface in the vicinity of the optical axis. Further, it is necessary to correct the spherical aberration when the zoom lens system has a smaller F number or a higher aperture ratio. In such a case, it is sufficient for correcting the spherical aberration to use, on the first positive lens component, an aspherical surface having the similar shape, i.e., having refractive power which becomes weaker toward the marginal portions than that of the spherical surface having the same carvature as that of the aspherical surface in the vicinity of the optical axis.

When the direction along the optical axis is taken as the x axis and the direction perpendicular to the optical axis is taken as the y axis, shape of the aspherical surfaces used in the zoom lens system according to the present invention is expressed by the following formula:

$$x = \frac{y^2/r}{1 + \sqrt{1 - (y/r)^2}} + \sum_{i=1}^{n} A_{2i} y^{2i}$$

wherein the reference symbol r represents radius of curvature on the optical axis and the reference symbol $A_{2i}$ designates the aspherical surface coefficient.

When it is attempted to design the zoom lens system according to the present invention so as to satisfy the condition (1) or the condition (5), the ratio of refractive power of the third lens unit relative to that of the second lens unit is apt to be lower than that in the conventional zoom lens system. The lens composition described above is advantageous for prolonging back focal length since the ray incident on the fourth lens unit is divergent.

However, the above-described composition is insufficient for obtaining a back focal length of at least 1.2 $f_s$.

In the present invention, a contrivance is made also on the fourth lens unit which is the so-called relay system so as to obtain a longer back focal length.

In order to prolong the back focal length of the fourth lens unit itself, it is necessary to determine power distribution in the fourth lens unit so as to locate the principal point of the zoom lens system on the image side of the fourth lens unit and as far therefrom as possible. For this purpose, it is necessary to arrange a strongly negative refractive power on the object side of the fourth lens unit. In order to prolong the back focal length, it is sufficient to strengthen this negative refractive power and strengthen the positive refractive power arranged on the image side of the fourth lens unit. In such a case, however, spherical aberration of high order and coma of high order are produced. Further, sicne the exit pupil is apart from the final surface of the lens system toward the object side, diameters of the rear lens and the light-splitting mirror for leading light into the viewfinder are enlarged, thereby making it necessary to further prolong the back focal length. In order to avoid this defect, it is generally practised to reduce said positive and negative refractive power respectively by reserving a certain space between the negative refractive power located on the object side and the positive refractive power located on the image side. However, this method can hardly correct the coma produced due to the asymmetrical relationship between the front and rear refractive powers nor the barrel-shaped distortion, and has little effect to prevent the exit pupil from being apart from the final surface of the zoom lens system.

The present invention has succeeded in correcting the above-mentioned defect by arranging at least two strongly diverging surfaces in the fourth lens unit and reserving an airspace of at least a certain width between these diverging surfaces. Out of these diverging surfaces, the strongly diverging surface located on the object side has a function mainly for locating the principal point on the iamge side, and it is preferable to design this surface so as to have the strongest diverging power in the fourth lens unit. Further, the strongly diverging surface located on the image side has a function for mainly correcting the aberrations produced by the image side surface having positive refractive power, and it is preferable to locate this image side diverging surface as close as possible to the image side surface having positive refractive power and design the image side diverging surface so as to have diverging power weaker than that of the object side diverging surface. For this reason, it is desirable to design the fourth lens unit so as to satisfy the following condition (6):

$$0.08 < D/f_s < 1.2 \qquad (6)$$

wherein the reference symbol D represents distance as measured along the optial axis between the surface having the strongest diverging power and the surface having the second strongest diverging power in the fourth lens unit.

If the lower limit of the condition (6) is exceeded, it will be impossible to correct spherical aberration and coma in the zoom lens system having an aperture ratio of F/2.8 while reserving an optical path length of back focal length of at least 1.2 $f_s$. If the upper limit of the condition (6) is exceeded, in contrast, the exit pupil will tend to be apart from the final surface toward the object side and said light-splitting mirror must be enlarged, thereby making it undesirably necessary to prolong the back focal length.

It is preferable for prolonging the back focal length to locate the surface having the strongest diverging power in the fourth lens unit on the object side of the surface having the second strongest diverging power. The back focal length can hardly be prolonged when the surface having the strongest diverging power is located on the image side of the surface having the second strongest diverging power.

It is preferable to design the fourth lens unit as the triplet type composed, in the order from the object side, of a lens component consisting only of positive lens elements, a lens component consisting only of negative lens elements, and a lens component consisting only of positive lens elements. In such a case, it is sufficient to design the extremely object side surface of the lens component consisting only of negative lens elements as the surface having the strongest diverging power and the extremely image side surface as the surface having the second strongest diverging power, and the distance D between these diverging surfaces so as to satisfy the condition (6). If the upper or lower limit of the condition (6) is exceeded, undesirable effect will be produced as described with reference to the condition (6).

When the lens component consisting only of negative lens elements in the fourth lens unit is composed of a single biconcave lens element, it is desirable that thickness $D_N$ of the biconcave lens element satisfies the following condition (7):

$$0.08 < D_N/f_s < 1.2 \qquad (7)$$

If the upper or lower limit of the condition (7) is exceeded, undesirable effects will be produced for the same reason as that described with reference to the condition (6). Further, exceeding of the upper limit of the condition (7) is undesirable from the viewpoints of transmittance and weight of the zoom lens system.

Further, in order to reduce the number of the lens elements, to obtain a long back focal length and to correct aberrations favorably, it is desirable to compose the fourth lens unit, in the order from the object side, of a positive lens component consisting of a single biconvex lens element, a negative lens component consisting of a single bicocave lens element and a positive lens component consisting of two positive lens elements. In this case, it is desirable that thickness $D_{4\,3}$ of the biconcave lens element satisfies the following condition (8):

$$0.08 < D_{4\,3}/f_s < 1.2 \qquad (8)$$

When the fourth lens unit is composed as described above, it is desirable to design the fourth lens unit so as to satisfy the following conditions (9) and (10):

$$-1.0 < R_{4\,3}/R_{4\,4} < -0.2 \qquad (9)$$

$$-1.01 < (R_{4\,1} + R_{4\,2})/(R_{4\,1} - R_{4\,2}) < 1.0 \qquad (10)$$

wherein the reference symbols $R_{4\,1}$ and $R_{4\,2}$ represent radii of curvature on the object side surface and the image side surface of the positive lens component arranged on the object side, and the reference symbols $R_{4\,1}$ and $R_{4\,2}$ designate radii of curvature on the object side surface and the image side surface of the negative lens component.

That is to say, the back focal length of the zoom lens system can be further prolonged by designing the negative lens component so as to be thick enough to satisfy the condition (8) as described above, the object side positive lens component as a single biconvex lens element and the radius of curvature on the object side surface of the negative lens component so as to be larger than that on the image side surface thereof.

It is desirable, as described above, to design the imaging lens system having a large aperture ratio on a fundamental composition of the triplet type for correcting aberrations favorably. Further, there is known the so-called double Gaussian type obtained by developing the triplet type. A lens system of this double Gaussian type comprises at least one diverging surface, and consists of two lens components having positive refractive power as a whole and arranged nearly symmetrically. In order to impart the characteristic of the triplet type also, said diverging surface is arranged nearly at the center of the lens system, thereby further enhancing aperture ratio thereof.

In order to obtain a long back focal length and a large aperture ratio set forth as the greatest objects of the present invention, the zoom lens system according to the present invention is so designed as to adopt the triplet type or the double Gaussian type for the fourth lens unit and locate the principal point thereof at a position as close to the image surface as possible. Accordingly, the fourth lens unit is composed of a positive lens element, a negative lens element, a positive lens element and a positive lens elements in the order from the object side as described above. Since it can be considered that the object side surface and the image side surface of the negative lens element arranged in the fourth lens unit correspond to the diverging surface of the object side lens component and the diverging surface of the image side lens component arranged in the double Gaussian type, the fourth lens unit can correct aberrations favorably even when the zoom lens system has a large aperture ratio. Speaking concretely, the object side diverging surface has a roll to correct the aberrations produced by the object side positive lens element, whereas the image side diverging surface has a roll to correct the aberrations produced by the image side two positive lens elements. Accordingly, it is preferable to reserve an airspace $D_{4\ 2}$ as narrow as possible between the object side positive lens element and the negative lens element, and an airspace $D_{4\ 4}$ as narrow as possible between the negative lens element and the positive lens element arranged on the image side thereof so as to satisfy the following conditions (11) and (12):

$$0.011 < D_{4\ 2}/f_s < 0.05 \tag{11}$$

$$0.016 < D_{4\ 4}/f_s < 0.1 \tag{12}$$

If the upper limit of the condition (11) or (12) is exceeded, it will be impossible to sufficiently correct the aberrations produced by the positive lens element (the object side positive lens component in case of the condition (11) or the image side two positive lens elements in case of the condition (12)). When it is attempted to correct the aberrations forcibly, the surfaces arranged on both the sides of the diverging surfaces will have too strong powers, and tend to produce spherical aberration and coma of high orders, thereby degrading image contrast If the lower limit of the condition (11) or (12) is exceeded, the object side positive lens element will interfere with the negative lens element at the marginal portions thereof and the negative lens element will interfere with the positive lens element arranged on the image side thereof at the marginal portions, thereby making it impossible to reserve sufficient effective diameters for these lens elements.

Also in the zoom lens system disclosed by Japanese Unexamined Published Patent Application No. 287810/63, the fourth lens unit is composed on the concept described above. However, the present invention has the object to provide a zoom lens system having a longer back focal length, favorably corrected aberrations and comprising a rear lens whose diameter is not enlarged. When the back focal length is prolonged, the negative refractive power of the lens element arranged on the object side in the fourth lens unit is apt to be stronger than that of the lens element arranged on the image side. However, by broardening the airspace reserved between these two lens elements, the back focal length can be prolonged without strengthening the refractive powers of the lens elements respectively. Accordingly, the present invention has adopted the thickness $D_{4\ 3}$ of the negative lens unit arranged in the fourth lens unit which is larger than that in the conventional zoom lens system, and a broader airspace between a front subunit and a rear subunit by designing the object side surface and the image side surface of the negative lens element as the surfaces of the object side lens element (front subunit) and the image side lens elements (rear subunit) respectively. Imparted to the object side surface of the negative lens element are a roll to correct the aberrations produced by the positive lens element arranged in the front subunit and another roll to prolong the back focal length. Though the front subunit and the rear subunit are arranged nearly symmetrically with each other for obtaining the refractive power distribution in the above-described double Gaussian type, it is necessary for prolonging the back focal length to relatively strengthen the negative refractive power of the front subunit and weaken the positive refractive power of the rear subunit. For this purpose, a single positive lens element is used in the front subunit, two positive lens elements are arranged in the rear subunit and radius of curvature on the object side surface of the negative lens element is smaller than that on the image side surface thereof in the zoom lens system according to the present invention. It is preferable to design the fourth lens unit in such a manner that the thickness $D_{4\ 3}$ of the negative lens element satisfies the above-mentioned condition (8), and that radii of curvature $R_{4\ 3}$ and $R_{4\ 4}$ on both the surfaces of the negative lens element satisfy the following condition (13):

$$-1.0 < R_{4\ 3}/R_{4\ 4} < -0.2 \tag{13}$$

Alternately, it is permissible to compose the rear subunit of a single positive lens element and strengthen the refractive power of this positive lens element. When the back focal length of the zoom lens system is prolonged, however, diameter of the light bundle is thickened on the rear subunit of the fourth lens unit and the rear subunit has a lens diameter larger than that of the front subunit since the exit pupil of the zoom lens system of this type is apart from the extremely image side surface toward the object side. When the power of the positive lens element in the rear subunit is strengthened in this zoom lens system, remarkable coma is produced by the ray passing through the high portion. It is therefore advantageous to use, on this positive lens element, an aspherical surface having curvature lowered toward the marginal portion.

When the lower limit of the condition (8) is exceeded, it is impossible, as described above, to favorably correct spherical aberration and coma at an aperture ratio of F/2.8 while reserving an optical path length of back focal length of at least 1.2 $f_s$. If the upper limit of the condition (8) is exceeded, the exit pupil is apart from the extremely image side surface toward the object side, thereby enlarging diameter of the rear lens.

The condition (13) defines a ratio of radius of curvature on the object side surface relative to that on the image side surface of the negative lens element arranged in the fourth lens unit. If the upper limit of the condition (13) is exceeded, it will be impossible to obtain an optical path length of the back focal length of at least 1.2 $f_s$.

If the lower limit of the condition (13) is exceeded, in contrast, spherical aberration and coma of high order will tend to be produced, thereby degrading image contrast.

In the zoom lens system according to the present invention, the vari-focal system (the first lens unit, the second lens unit and the third lens unit) is so designed as to have a negative total refractive power for obtaining diverging incident light on the fourth lens unit, thereby lessening the burden on the fourth lens unit for prolonging the back focal length of the zoom lens system. Accordingly, it is preferable to select, for the positive lens element arranged in the extremely object side in the fourth lens unit, a shape factor having a value located on the positive side as compared with that for the ordinary zoom lens system. It is desirable to determine the shape factor for the positive lens element within the range defined by the following condition (14):

$$-1.0 < (R_{4\,1} + R_{4\,2})/(R_{4\,1} - R_{4\,2}) < 1.0 \qquad (14)$$

If the lower limit of the condition (14) is exceeded, angle of incidence will be enlarged on the object side surface of the fourth lens unit, thereby allowing spherical aberration and coma to be easily produced. If the upper limit of the condition (14) is exceeded, in contrast, the exit pupil will be apart from the extremely image side surface toward the object side, thereby producing a tendency to enlarge diameter of the rear lens.

Further, in order to prolong the back focal length of the zoom lens system, it is desirable to design the fourth lens unit so as to satisfy the following condition (15):

$$0.1 < D_{4\,1}/f_s < 0.31 \qquad (15)$$

wherein the reference symbol $D_{4\,1}$ represents thickness of the positive lens element arranged on the object side in the fourth lens unit.

In order to prevent the total length of the zoom lens system from being prolonged even when the negative lens element is thickened in the fourth lens unit, it is preferable to make $D_{4\,1}$ as small as possible. If the upper limit of the condition (15) is exceeded, $D_{4\,3}$ can hardly be enlarged, thereby making it difficult to prolong the back focal length of the zoom lens system. If the lower limit of the condition (15) is exceeded, in contrast, it will be hard to reserve the required effective diameter for the lens element arranged on the object side in the fourth lens unit. When the fourth lens unit is so designed as to satisfy the condition (15), it is possible to obtain a zoom lens system having favorably corrected aberrations while reserving an optical path length of back focal length of at least 1.2 $f_s$.

Furthermore, it is desirable to design the fourth lens unit so as to satisfy the following condition (16):

$$0.7 < (R_{4\,7} + R_{4\,8})/(R_{4\,7} - R_{4\,8}) < 0.4 \qquad (16)$$

wherein the reference symbols $R_{4\,7}$ and $R_{4\,8}$ represent radii of curvature on the object side surface and the image side surface respectively of the positive lens element arranged on the extremely image side in the fourth lens unit.

The condition (16) defines shape factor for the lens element arranged on the extremely image side in the fourth lens unit. In the zoom lens system according to the present invention, diverging light is incident on the fourth lens unit for prolonging the back focal length of the zoom lens system. When the diverging light is incident on the fourth lens unit as described above, it is preferable to limit magnification of the fourth lens unit within the range defined by the following formula:

$$0.35 < |\beta_{IV}| < 0.7 (\beta_{IV} < 0)$$

wherein the reference symbol $\beta_{IV}$ represents magnification of the fourth lens unit.

In general zoom lens systems, $\beta_{IV}$ is nearly equal to zero since an afocal light bundle is incident on the fourth lens unit (imaging lens unit).

The present invention selects $\beta_{IV}$ within the range defined by the above-mentioned formula so that the zoom lens system as a whole has a long back focal length. Accordingly, the paraxial rays incident on the fourth lens unit have a negative inclination angle or a diverging angle as a whole. Since the paraxial rays emerging from the positive lens element arranged on the extremely image side have a small angle of emergence, it is desirable that the extremely image side surface of the fourth lens unit has a radius of curvature $R_{4\,8} < 0$ and that the positive lens element arranged on the extremely image side is designed as a biconvex lens element. Especially it is preferable to design the positive lens element arranged on the extremely image side so as to have a shape satisfying the condition (16).

If the lower limit of the condition (16) is exceeded, spherical aberration and coma will be produced easily. If the upper limit of the condition (16) is exceeded, the exit pupil will tend to be apart from the extremely image side surface toward the object side and the rear lens will tend to have a large diameter.

BRIEF DESCRIPTION OF THE DRAWINGS

FIG. 1 through FIG. 12 show sectional views illustrating compositions of Embodiments 1 through 12 of the zoom lens system according to the present invention;

FIG. 31 through FIG. 33 show graphs illustrating aberration characteristics of the Embodiment 7 of the present invention;

FIG. 37 through FIG. 39 show curves illustrating aberration characteristics of the Embodiment 9 of the present invention;

DETAILED DESCRIPTION OF THE PREFERRED EMBODIMENTS

Figure 3:
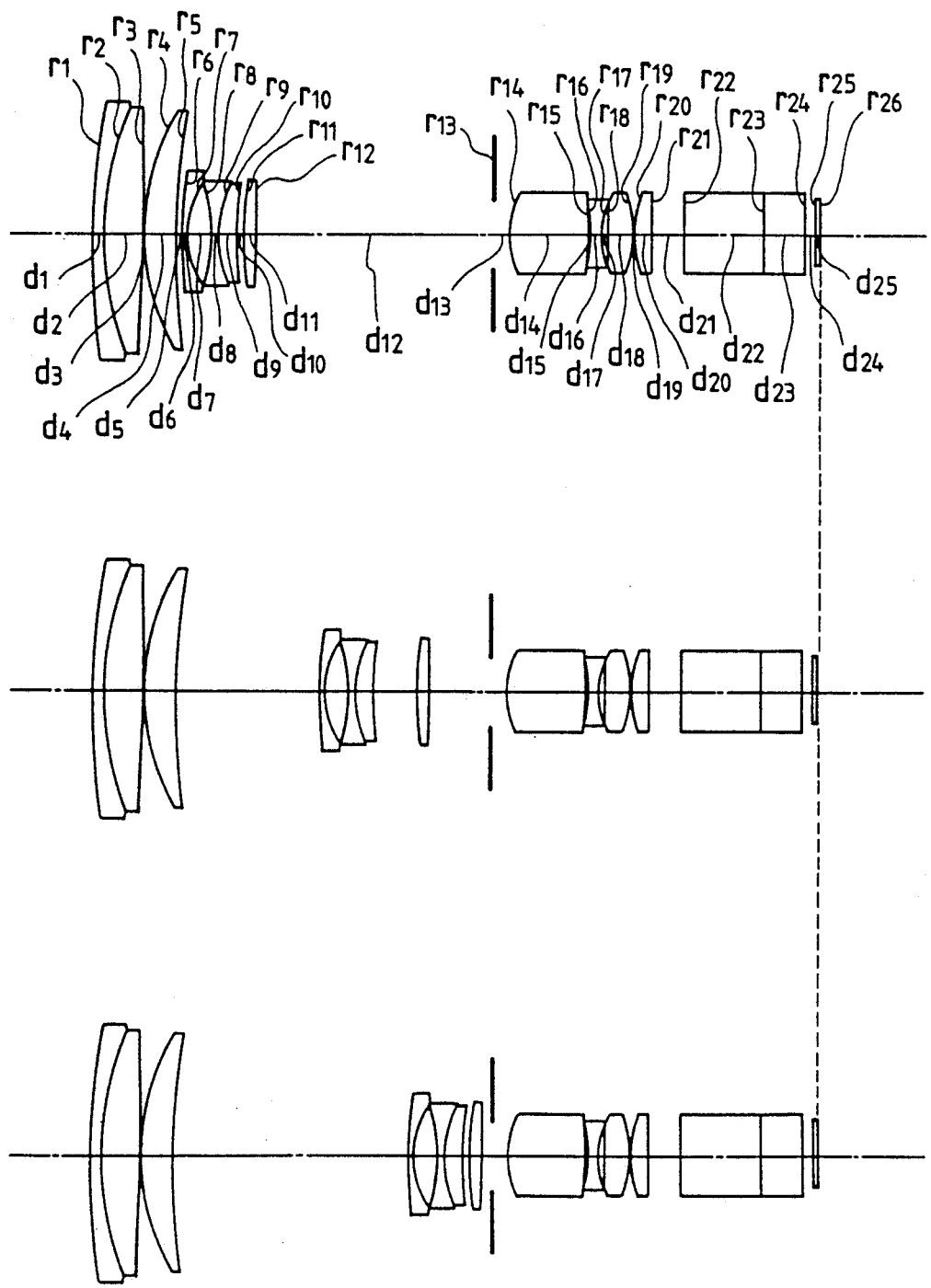

Now, the present invention will be described more detailedly below with reference to the preferred embodiments shown in the accompanying drawings and given in the form of numerical data:

Embodiment 1
f = 9~27 mm, F/2.8, 2ω = 48.7°~18.2°

$r_1 = 20.5698$
  $d_1 = 1.5000$  $n_1 = 1.84666$  $\nu_1 = 23.78$
$r_2 = 15.2436$
  $d_2 = 0.3800$
$r_3 = 16.2889$
  $d_3 = 5.5000$  $n_2 = 1.69680$  $\nu_2 = 55.52$
$r_4 = 1264.2130$
  $d_4 = D_1$
$r_5 = 52.6236$
  $d_5 = 0.9000$  $n_3 = 1.83400$  $\nu_3 = 37.16$
$r_6 = 8.9934$
  $d_6 = 2.3000$
$r_7 = -71.5175$
  $d_7 = 0.9000$  $n_4 = 1.69680$  $\nu_4 = 55.52$
$r_8 = 13.0000$
  $d_8 = 1.6000$  $n_5 = 1.69895$  $\nu_5 = 30.12$
$r_9 = 25.3099$
  $d_9 = D_2$
$r_{10} = 22.5861$
  $d_{10} = 1.9000$  $n_6 = 1.84666$  $\nu_6 = 23.78$
$r_{11} = -89.7285$
  $d_{11} = D_3$
$r_{12} = \infty$ (stop)
  $d_{12} = 1.5000$
$r_{13} = 10.0989$
  $d_{13} = 5.8658$  $n_7 = 1.72342$  $\nu_7 = 38.03$
$r_{14} = -38.4266$
  $d_{14} = 0.5000$
$r_{15} = -12.5379$
  $d_{15} = 1.0000$  $n_8 = 1.84666$  $\nu_8 = 23.78$
$r_{16} = 12.3959$
  $d_{16} = 1.8688$
$r_{17} = 53.9661$
  $d_{17} = 3.2000$  $n_9 = 1.69680$  $\nu_9 = 55.52$
$r_{18} = -12.8206$
  $d_{18} = 0.1500$
$r_{19} = 25.9278$
  $d_{19} = 2.3000$  $n_{10} = 1.69680$  $\nu_{10} = 55.52$
$r_{20} = -41.7135$
  $d_{20} = 4.0000$
$r_{21} = \infty$
  $d_{21} = 10.1000$  $n_{11} = 1.51633$  $\nu_{11} = 64.15$
$r_{22} = \infty$
  $d_{22} = 5.1000$  $n_{12} = 1.54771$  $\nu_{12} = 62.83$
$r_{23} = \infty$
  $d_{23} = 1.2100$
$r_{24} = \infty$
  $d_{24} = 0.6000$  $n_{13} = 1.48749$  $\nu_{13} = 70.20$
$r_{25} = \infty$

| f | 9.27 | 15.58 | 26.19 |
|---|---|---|---|
| $D_1$ | 0.600 | 7.282 | 12.749 |
| $D_2$ | 0.800 | 1.466 | 0.800 |
| $D_3$ | 13.449 | 6.102 | 1.300 |

$\beta_{2s} = -0.407$,  $|f_{IIIII}|/fw = 1.207$
$\nu_{3p} = 23.78$,  $(D_{2W} - D_{2T})/fs = 0.0$ $f_{III}/\sqrt{fw \cdot f_T} = 1.378$ Embodiment 2
f = 9~27 mm, F/2.0, 2ω = 48.7°~18.2°

$r_1 = 21.9333$
  $d_1 = 1.5000$  $n_1 = 1.84666$  $\nu_1 = 23.78$
$r_2 = 16.5730$
  $d_2 = 0.7000$
$r_3 = 18.0721$
  $d_3 = 6.5000$  $n_2 = 1.69680$  $\nu_2 = 55.52$
$r_4 = -2286.1934$
  $d_4 = D_1$
$r_5 = 70.3935$
  $d_5 = 0.9000$  $n_3 = 1.83400$  $\nu_3 = 37.16$
$r_6 = 9.2358$
  $d_6 = 2.9000$
$r_7 = -16.7332$
  $d_7 = 0.9000$  $n_4 = 1.69680$  $\nu_4 = 55.52$
$r_8 = 15.0000$
  $d_8 = 1.6000$  $n_5 = 1.69895$  $\nu_5 = 30.12$
$r_9 = 39.5957$
  $d_9 = D_2$
$r_{10} = 27.6482$
  $d_{10}\ 2.1000$  $n_6 = 1.84666$  $\nu_6 = 23.78$
$r_{11} = -62.4928$
  $d_{11} = D_3$
$r_{12} = \infty$ (stop)
  $d_{12} = 1.5000$
$r_{13} = 14.5675$
  $d_{13} = 6.4043$  $n_7 = 1.80610$  $\nu_7 = 40.95$
$r_{14} = -50.1841$
  $d_{14} = 0.7500$
$r_{15} = -15.0522$
  $d_{15} = 2.6651$  $n_8 = 1.84666$  $\nu_8 = 23.78$
$r_{16} = 17.2822$
  $d_{16} = 1.3423$
$r_{17} = 56.1518$
  $d_{17} = 3.6000$  $n_9 = 1.69680$  $\nu_9 = 55.52$
$r_{18} = -14.5156$
  $d_{18} = 0.1500$
$r_{19} = 24.7980$
  $d_{19} = 2.9000$  $n_{10} = 1.69680$  $\nu_{10} = 55.52$
$r_{20} = -46.2758$
  $d_{20} = 4.1000$
$r_{21} = \infty$
  $d_{21} = 10.1000$  $n_{11} = 1.51633$  $\nu_{11} = 64.15$
$r_{22} = \infty$
  $d_{22} = 5.1000$  $n_{12} = 1.54771$  $\nu_{12} = 62.83$
$r_{23} = \infty$
  $d_{23} = 1.2100$
$r_{24} = \infty$
  $d_{24} = 0.6000$  $n_{13} = 1.48749$  $\nu_{13} = 70.20$
$r_{25} = \infty$

| f | 9.27 | 15.58 | 26.19 |
|---|---|---|---|
| $D_1$ | 0.600 | 7.625 | 13.509 |
| $D_2$ | 0.800 | 1.481 | 0.800 |
| $D_3$ | 14.209 | 6.503 | 1.300 |

$\beta_{2s} = -0.399$,  $|f_{IIIII}|/fw = 1.282$
$\nu_{3p} = 23.78$,  $(D_{2w} - D_{2T})/fs = 0.0$ $f_{III}/\sqrt{fw \cdot f_T} = 1.469$ Embodiment 3
f = 9~54 mm, F/2.8, 2ω = 48.7°~9.2°

$r_1 = 126.1022$
  $d_1 = 1.5000$  $n_1 = 1.80518$  $\nu_1 = 25.43$
$r_2 = 48.5060$
  $d_2 = 4.5000$  $n_2 = 1.60311$  $\nu_2 = 60.70$
$r_3 = -310.3639$
  $d_3 = 0.1500$
$r_4 = 36.2200$
  $d_4 = 3.8000$  $n_3 = 1.69680$  $\nu_3 = 55.52$
$r_5 = 137.5296$
  $d_5 = D_1$
$r_6 = 80.2290$
  $d_6 = 0.9000$  $n_4 = 1.83400$  $\nu_4 = 37.16$
$r_7 = 13.9236$
  $d_7 = 2.8000$
$r_8 = -23.8032$ 4,969,721

Embodiment 3
f = 9~54 mm, F/2.8, 2ω = 48.7°~9.2°

| | | | |
|---|---|---|---|
| r₉ = 15.0000 | d₈ = 0.9000 | n₅ = 1.69680 | ν₅ = 55.52 |
| r₁₀ = 61.3240 | d₉ = 2.3000 | n₆ = 1.69895 | ν₆ = 30.12 |
| r₁₁ = 55.7543 | d₁₀ = D₂ | | |
| r₁₂ = −155.1359 | d₁₁ = 1.7000 | n₇ = 1.84666 | ν₇ = 23.78 |
| r₁₃ = ∞ (stop) | d₁₂ = D₃ | | |
| r₁₄ = 11.8785 | d₁₃ = 1.5000 | | |
| r₁₅ = −70.5443 | d₁₄ = 10.0865 | n₈ = 1.80610 | ν₈ = 40.95 |
| r₁₆ = −14.9386 | d₁₅ = 0.5000 | | |
| r₁₇ = 13.0264 | d₁₆ = 1.0000 | n₉ = 1.84666 | ν₉ = 23.78 |
| r₁₈ = 57.8903 | d₁₇ = 0.7000 | | |
| r₁₉ = −16.5053 | d₁₈ = 3.2000 | n₁₀ = 1.69680 | ν₁₀ = 55.52 |
| r₂₀ = 19.5419 | d₁₉ = 0.1500 | | |
| r₂₁ = −1097.4735 | d₂₀ = 2.3000 | n₁₁ = 1.72342 | ν₁₁ = 38.03 |
| r₂₂ = ∞ | d₂₁ = 4.0000 | | |
| r₂₃ = ∞ | d₂₂ = 10.1000 | n₁₂ = 1.51633 | ν₁₂ = 64.15 |
| r₂₄ = ∞ | d₂₃ = 5.1000 | n₁₃ = 1.54771 | ν₁₃ = 62.83 |
| r₂₅ = ∞ | d₂₄ = 1.2100 | | |
| r₂₆ = ∞ | d₂₅ = 0.6000 | n₁₄ = 1.48749 | ν₁₄ = 70.20 |

| f | 9.27 | 22.04 | 52.38 |
|---|---|---|---|
| D₁ | 0.600 | 17.883 | 29.244 |
| D₂ | 0.800 | 5.594 | 0.800 |
| D₃ | 29.944 | 7.867 | 1.300 |

β₂ₛ = −0.500,  |f_{IIII}|/fw = 1.579
ν₃ₚ = 23.78,  (D₂w−D₂T)/fs = 0.0

$f_{III}/\sqrt{fw \cdot f_T} = 2.207$

Embodiment 4
f = 9~27 mm, F/1.4, 2ω = 48.7°~18.2°

| | | | |
|---|---|---|---|
| r₁ = 24.4460 | d₁ = 2.0000 | n₁ = 1.84666 | ν₁ = 23.78 |
| r₂ = 18.5611 | d₂ = 0.6700 | | |
| r₃ = 19.6562 | d₃ = 8.0000 | n₂ = 1.69680 | ν₂ = 55.52 |
| r₄ = 176.9296 | d₄ = D₁ | | |
| r₅ = 28.5775 | d₅ = 0.9000 | n₃ = 1.83400 | ν₃ = 37.16 |
| r₆ = 9.4317 | d₆ = 4.3000 | | |
| r₇ = −19.1379 | d₇ = 0.9000 | n₄ = 1.69680 | ν₄ = 55.52 |
| r₈ = 21.0000 | d₈ = 1.6000 | n₅ = 1.69895 | ν₅ = 30.12 |
| r₉ = 38.5204 | d₉ = D₂ | | |
| r₁₀ = 30.6746 | d₁₀ = 2.4000 | n₆ = 1.84666 | ν₆ = 23.78 |
| r₁₁ = −82.4297 | d₁₁ = D₃ | | |
| r₁₂ = ∞ (stop) | d₁₂ = 2.0000 | | |
| r₁₃ = 20.3769 | d₁₃ = 5.0385 | n₇ = 1.80610 | ν₇ = 40.95 |
| r₁₄ = −33.2123 | d₁₄ = 0.4400 | | |
| r₁₅ = −20.3574 | d₁₅ = 1.0000 | n₈ = 1.84666 | ν₈ = 23.78 |
| r₁₆ = −105.5308 | d₁₆ = 5.4215 | | |
| r₁₇ = −219.3635 | d₁₇ = 1.5000 | n₉ = 1.80518 | ν₉ = 25.43 |
| r₁₈ = 17.9140 | d₁₈ = 0.4800 | | |
| r₁₉ = 25.7928 | d₁₉ = 3.8000 | n₁₀ = 1.69680 | ν₁₀ = 55.52 |
| r₂₀ = −20.9625 | d₂₀ = 0.1500 | | |
| r₂₁ = 15.4959 | d₂₁ = 3.5000 | n₁₁ = 1.69680 | ν₁₁ = 55.52 |
| r₂₂ = 166.0511 | d₂₂ = 4.1000 | | |
| r₂₃ = ∞ | d₂₃ = 5.5000 | n₁₂ = 1.51633 | ν₁₂ = 64.15 |
| r₂₄ = ∞ | d₂₄ = 1.2100 | | |
| r₂₅ = ∞ | d₂₅ = 0.6000 | n₁₃ = 1.48749 | ν₁₃ = 70.20 |
| r₂₆ = ∞ | | | |

| f | 9.27 | 15.58 | 26.19 |
|---|---|---|---|
| D₁ | 0.600 | 9.176 | 16.020 |
| D₂ | 0.800 | 1.609 | 0.800 |
| D₃ | 16.720 | 7.335 | 1.300 |

β₂ₛ = −0.402,  |f_{IIII}|/fw = 1.532
ν₃ₚ = 23.78,  (D₂w−D₂T)/fs = 0.0

$f_{III}/\sqrt{fw \cdot f_T} = 1.711$

Embodiment 5
f = 9~27 mm, F/2.8, 2ω = 48.7°~18.2°

| | | | |
|---|---|---|---|
| r₁ = 20.3585 | d₁ = 1.5000 | n₁ = 1.84666 | ν₁ = 23.78 |
| r₂ = 15.4113 | d₂ = 0.3200 | | |
| r₃ = 16.3678 | d₃ = 5.2000 | n₂ = 1.69680 | ν₂ = 55.52 |
| r₄ = 289.7401 | d₄ = D₁ | | |
| r₅ = 53.8105 | d₅ = 0.9000 | n₃ = 1.83400 | ν₃ = 37.16 |
| r₆ = 8.8546 | d₆ = 2.3000 | | |
| r₇ = −18.1138 | d₇ = 0.9000 | n₄ = 1.69680 | ν₄ = 55.52 |
| r₈ = 36.9531 | d₈ = D₂ | | |
| r₉ = 22.7181 | d₉ = 2.2000 | n₅ = 1.84666 | ν₅ = 23.78 |
| r₁₀ = −24.0000 | d₁₀ = 1.0000 | n₆ = 1.69680 | ν₆ = 55.52 |
| r₁₁ = 44346.8880 | d₁₁ = D₃ | | |
| r₁₂ = ∞ (stop) | d₁₂ = 1.5000 | | |
| r₁₃ = 10.7102 | d₁₃ = 6.2055 | n₇ = 1.70154 | ν₇ = 41.21 |
| r₁₄ = −23.6782 | d₁₄ = 0.2000 | | |
| r₁₅ = −14.1954 | d₁₅ = 1.0000 | n₈ = 1.84666 | ν₈ = 23.78 |
| r₁₆ = 13.9290 | d₁₆ = 2.8026 | | |
| r₁₇ = 17.4080 (aspherical surface) | d₁₇ = 5.0000 | n₉ = 1.69680 | ν₉ = 55.52 |
| r₁₈ = −11.4365 | d₁₈ = 4.0000 | | |
| r₁₉ = ∞ | d₁₉ = 10.1000 | n₁₀ = 1.51633 | ν₁₀ = 64.15 |
| r₂₀ = ∞ | d₂₀ = 5.1000 | n₁₁ = 1.54771 | ν₁₁ = 62.83 |
| r₂₁ = ∞ | d₂₁ = 1.2100 | | |
| r₂₂ = ∞ | d₂₂ = 0.6000 | n₁₂ = 1.48749 | ν₁₂ = 70.20 |

-continued

Embodiment 5
f = 9~27 mm, F/2.8, 2ω = 48.7°~18.2° r$_{23}$ = ∞ aspherical surface coefficients
A$_4$ = −0.26854 × 10$^{-3}$, A$_6$ = 0.13179 × 10$^{-5}$
A$_8$ = −0.28548 × 10$^{-7}$

| f | 9.27 | 15.58 | 26.19 |
|---|---|---|---|
| D$_1$ | 0.600 | 7.630 | 13.116 |
| D$_2$ | 0.800 | 1.582 | 0.800 |
| D$_3$ | 13.816 | 6.004 | 1.300 |

β$_{2s}$ = −0.434,   |f$_{IIII}$|/fw = 1.243
ν$_{3p}$ = 23.78,   (D$_{2w}$−D$_{2T}$)/fs = 0.0 f$_{III}$/$\sqrt{fw \cdot f_T}$ = 1.485

Embodiment 6
f = 9~54 mm, F/1.4, 2ω = 48.7°~9.2°

| | | | |
|---|---|---|---|
| r$_1$ = 133.2040 | d$_1$ = 1.5000 | n$_1$ = 1.80518 | ν$_1$ = 25.43 |
| r$_2$ = 59.2562 | d$_2$ = 6.5000 | n$_2$ = 1.60311 | ν$_2$ = 60.70 |
| r$_3$ = −218.4745 | d$_3$ = 0.1500 | | |
| r$_4$ = 46.7875 | d$_4$ = 4.3000 | n$_3$ = 1.69680 | ν$_3$ = 55.52 |
| r$_5$ = 136.2198 | d$_5$ = D$_1$ | | |
| r$_6$ = 74.8595 | d$_6$ = 0.9000 | n$_4$ = 1.83400 | ν$_4$ = 37.16 |
| r$_7$ = 16.5062 | d$_7$ = 4.3000 | | |
| r$_8$ = −22.9074 | d$_8$ = 0.9000 | n$_5$ = 1.69680 | ν$_5$ = 55.52 |
| r$_9$ = 161.7260 | d$_9$ = D$_2$ | | |
| r$_{10}$ = 53.4934 | d$_{10}$ = 3.0000 | n$_6$ = 1.84666 | ν$_6$ = 23.78 |
| r$_{11}$ = −39.3515 | d$_{11}$ = 1.0000 | n$_7$ = 1.69680 | ν$_7$ = 55.52 |
| r$_{12}$ = 368.8143 | d$_{12}$ = D$_3$ | | |
| r$_{13}$ = ∞ (stop) | d$_{13}$ = 2.0000 | | |
| r$_{14}$ = 19.8034 | d$_{14}$ = 4.5000 | n$_8$ = 1.77250 | ν$_8$ = 49.66 |
| r$_{15}$ = −59.8241 | d$_{15}$ = 0.7500 | | |
| r$_{16}$ = −27.0622 | d$_{16}$ = 1.0000 | n$_9$ = 1.84666 | ν$_9$ = 23.78 |
| r$_{17}$ = 4023.1309 | d$_{17}$ = 9.5718 | | |
| r$_{18}$ = 70.2215 | d$_{18}$ = 4.5000 | n$_{10}$ = 1.69680 | ν$_{10}$ = 55.52 |
| r$_{19}$ = −27.0510 | d$_{19}$ = 0.1500 | | |
| r$_{20}$ = 20.5147 | d$_{20}$ = 3.0000 | n$_{11}$ = 1.69680 | ν$_{11}$ = 55.52 |
| r$_{21}$ = 204.7427 | d$_{21}$ = 1.6000 | | |
| r$_{22}$ = −22.7450 | d$_{22}$ = 1.0000 | n$_{12}$ = 1.84666 | ν$_{12}$ = 23.78 |
| r$_{23}$ = −134.7313 | d$_{23}$ = 4.0000 | | |
| r$_{24}$ = ∞ | d$_{24}$ = 8.0000 | n$_{13}$ = 1.51633 | ν$_{13}$ = 64.15 |
| r$_{25}$ = ∞ | d$_{25}$ = 5.1000 | n$_{14}$ = 1.54771 | ν$_{14}$ = 62.83 |
| r$_{26}$ = ∞ | | | |

| f | 9.27 | 22.04 | 52.38 |
|---|---|---|---|
| D$_1$ | 0.600 | 20.994 | 34.882 |
| D$_2$ | 0.800 | 6.621 | 0.800 |
| D$_3$ | 35.582 | 9.367 | 1.300 |

β$_{2s}$ = −0.499,   |f$_{IIII}$|/fw = 1.890
ν$_{3p}$ = 23.78,   (D$_{2w}$−D$_{2T}$)/fs = 0.0 f$_{III}$/$\sqrt{fw \cdot f_T}$ = 2.561

Embodiment 7
f = 8~24 mm, F/2.8, 2ω = 54.0°~20.5°

| | | | |
|---|---|---|---|
| r$_1$ = 73.2004 | d$_1$ = 1.6000 | n$_1$ = 1.84666 | ν$_1$ = 23.78 |
| r$_2$ = 38.6631 | d$_2$ = 4.1000 | n$_2$ = 1.60311 | ν$_2$ = 60.70 |
| r$_3$ = −296.7193 | d$_3$ = 0.1500 | | |
| r$_4$ = 25.2092 | d$_4$ = 3.6000 | n$_3$ = 1.71300 | ν$_3$ = 53.84 |
| r$_5$ = 96.0259 | d$_5$ = D$_1$ | | |
| r$_6$ = 42.4751 | d$_6$ = 0.9000 | n$_4$ = 1.83400 | ν$_4$ = 37.16 |
| r$_7$ = 8.9245 | d$_7$ = 3.2000 | | |
| r$_8$ = −14.4872 | d$_8$ = 0.9000 | n$_5$ = 1.69680 | ν$_5$ = 55.52 |
| r$_9$ = 13.1736 | d$_9$ = 2.1000 | n$_6$ = 1.84666 | ν$_6$ = 23.78 |
| r$_{10}$ = 99.3340 | d$_{10}$ = D$_2$ | | |
| r$_{11}$ = 38.3565 | d$_{11}$ = 1.6000 | n$_7$ = 1.84666 | ν$_7$ = 23.78 |
| r$_{12}$ = −147.1026 | d$_{12}$ = D$_3$ | | |
| r$_{13}$ = ∞ (stop) | d$_{13}$ = 1.5000 | | |
| r$_{14}$ = 12.2431 | d$_{14}$ = 6.0144 | n$_8$ = 1.76200 | ν$_8$ = 40.10 |
| r$_{15}$ = −28.0696 | d$_{15}$ = 0.2700 | | |
| r$_{16}$ = −12.3996 | d$_{16}$ = 1.4455 | n$_9$ = 1.84666 | ν$_9$ = 23.78 |
| r$_{17}$ = 12.7019 | d$_{17}$ = 2.8178 | | |
| r$_{18}$ = 52.4534 | d$_{18}$ = 3.5000 | n$_{10}$ = 1.69680 | ν$_{10}$ = 55.52 |
| r$_{19}$ = −12.2285 | d$_{19}$ = 0.1500 | | |
| r$_{20}$ = 30.2496 | d$_{20}$ = 2.5000 | n$_{11}$ = 1.69680 | ν$_{11}$ = 55.52 |
| r$_{21}$ = −43.4650 | d$_{21}$ = 4.5000 | | |
| r$_{22}$ = ∞ | d$_{22}$ = 7.9000 | n$_{12}$ = 1.51633 | ν$_{12}$ = 64.15 |
| r$_{23}$ = ∞ | d$_{23}$ = 1.2000 | n$_{13}$ = 1.51633 | ν$_{13}$ = 64.15 |
| r$_{24}$ = ∞ | d$_{24}$ = 5.1000 | n$_{14}$ = 1.54771 | ν$_{14}$ = 62.83 |
| r$_{25}$ = ∞ | d$_{25}$ = 0.9000 | | |
| r$_{26}$ = ∞ | d$_{26}$ = 0.7000 | n$_{15}$ = 1.51633 | ν$_{15}$ = 64.15 |
| r$_{27}$ = ∞ | d$_{27}$ = 0.3100 | | |
| r$_{28}$ = ∞ | d$_{28}$ = 0.6000 | n$_{16}$ = 1.48749 | ν$_{16}$ = 70.20 |
| r$_{29}$ = ∞ | | | |

| f | 8.24 | 13.85 | 23.28 |
|---|---|---|---|
| D$_1$ | 0.600 | 7.689 | 13.162 |
| D$_2$ | 0.930 | 2.138 | 0.800 |
| D$_3$ | 13.732 | 5.436 | 1.300 |

β$_{2s}$ = 0.524,   |f$_{IIII}$|/fw = 1.416
ν$_{3p}$ = 23.78,   (D$_{2w}$−D$_{2T}$)/fs = 0.0094 f$_{III}$/$\sqrt{fw \cdot f_T}$ = 2.605

Embodiment 8
f = 9~27 mm, F/2.8, 2ω = 48.7°~18.2°

| | | | |
|---|---|---|---|
| r$_1$ = 21.0708 | d$_1$ = 1.6000 | n$_1$ = 1.84666 | ν$_1$ = 23.78 |
| r$_2$ = 15.4497 | d$_2$ = 0.3000 | | |
| r$_3$ = 16.3292 | d$_3$ = 5.7000 | n$_2$ = 1.69680 | ν$_2$ = 55.52 |
| r$_4$ = 709.5292 | d$_4$ = D$_1$ | | |

-continued

Embodiment 8
f = 9~27 mm, F/2.8, 2ω = 48.7°~18.2°

| | | | |
|---|---|---|---|
| $r_5 = 55.3981$ | | | |
| | $d_5 = 0.9000$ | $n_3 = 1.69680$ | $v_3 = 55.52$ |
| $r_6 = 8.3563$ | | | |
| | $d_6 = 2.4000$ | | |
| $r_7 = -17.9562$ | | | |
| | $d_7 = 0.9000$ | $n_4 = 1.69680$ | $v_4 = 55.52$ |
| $r_8 = 11.8475$ | | | |
| | $d_8 = 1.9000$ | $n_5 = 1.84666$ | $v_5 = 23.78$ |
| $r_9 = 45.7885$ | | | |
| | $d_9 = D_2$ | | |
| $r_{10} = 33.3223$ | | | |
| | $d_{10} = 1.5000$ | $n_6 = 1.69680$ | $v_6 = 55.52$ |
| $r_{11} = -174.6557$ | | | |
| | $d_{11} = D_3$ | | |
| $r_{12} = \infty$ (stop) | | | |
| | $d_{12} = 1.5000$ | | |
| $r_{13} = 10.8481$ | | | |
| | $d_{13} = 5.2096$ | $n_7 = 1.74950$ | $v_7 = 35.27$ |
| $r_{14} = -17.7465$ | | | |
| | $d_{14} = 0.2100$ | | |
| $r_{15} = -11.3031$ | | | |
| | $d_{15} = 0.9440$ | $n_8 = 1.84666$ | $v_8 = 23.78$ |
| $r_{16} = 11.3031$ | | | |
| | $d_{16} = 2.9153$ | | |
| $r_{17} = 47.7945$ | | | |
| | $d_{17} = 3.5000$ | $n_9 = 1.69680$ | $v_9 = 55.52$ |
| $r_{18} = -12.0729$ | | | |
| | $d_{18} = 0.1500$ | | |
| $r_{19} = 40.1164$ | | | |
| | $d_{19} = 2.0000$ | $n_{10} = 1.69680$ | $v_{10} = 55.52$ |
| $r_{20} = -50.1483$ | | | |
| | $d_{20} = 4.9500$ | | |
| $r_{21} = \infty$ | | | |
| | $d_{21} = 9.8000$ | $n_{11} = 1.51633$ | $v_{11} = 64.15$ |
| $r_{22} = \infty$ | | | |
| | $d_{22} = 5.1000$ | $n_{12} = 1.54771$ | $v_{12} = 62.83$ |
| $r_{23} = \infty$ | | | |
| | $d_{23} = 1.2100$ | | |
| $r_{24} = \infty$ | | | |
| | $d_{24} = 0.6000$ | $n_{13} = 1.48749$ | $v_{13} = 70.20$ |
| $r_{25} = \infty$ | | | |
| f | 9.27 | 15.58 | 26.19 |
| $D_1$ | 0.600 | 7.416 | 12.830 |
| $D_2$ | 0.930 | 2.414 | 0.800 |
| $D_3$ | 13.400 | 5.100 | 1.300 |

$\beta_{2s} = 0.562$, $|f_{IIIII}|/f_w = 1.224$
$v_{3p} = 55.52$, $(D_{2w} - D_{2T})/f_s = 0.0083$
$f_{III}/\sqrt{f_w \cdot f_T} = 2.585$

Embodiment 9
f = 9.27 ~ 26.2, F/2.7, 2ω = 48.8° ~ 18.2°

| | | | |
|---|---|---|---|
| $r_1 = 58.6227$ | $d_1 = 1.6000$ | $n_1 = 1.84666$ | $v_1 = 23.78$ |
| $r_2 = 32.7895$ | $d_2 = 0.0800$ | | |
| $r_3 = 34.0236$ | $d_3 = 3.6000$ | $n_2 = 1.60311$ | $v_2 = 60.70$ |
| $r_4 = -297.1367$ | $d_4 = 0.1500$ | | |
| $r_5 = 27.3864$ | $d_5 = 2.9000$ | $n_3 = 1.69680$ | $v_3 = 55.52$ |
| $r_6 = 126.4442$ | $d_6 = D_1$ | | |
| $r_7 = 94.1624$ | $d_7 = 0.9000$ | $n_4 = 1.83400$ | $v_4 = 37.16$ |
| $r_8 = 9.3506$ | $d_8 = 2.5000$ | | |
| $r_9 = -13.1959$ | $d_9 = 0.9000$ | $n_5 = 1.74320$ | $v_5 = 49.31$ |
| $r_{10} = 13.1959$ | $d_{10} = 2.2000$ | $n_6 = 1.84666$ | $v_6 = 23.78$ |
| $r_{11} = -93.2143$ | $d_{11} = D_2$ | | |
| $r_{12} = 47.9385$ | $d_{12} = 1.6000$ | $n_7 = 1.83400$ | $v_7 = 37.16$ |
| $r_{13} = -98.2098$ | $d_{13} = D_3$ | | |
| $r_{14} = \infty$ (stop) | $d_{14} = 1.6000$ | | |
| $r_{15} = 13.8613$ | $d_{15} = 2.8000$ | $n_8 = 1.70154$ | $v_8 = 41.21$ |
| $r_{16} = -68.4776$ | $d_{16} = 0.4600$ | | |
| $r_{17} = -13.7738$ | $d_{17} = 6.0000$ | $n_9 = 1.80518$ | $v_9 = 25.43$ |
| $r_{18} = 20.9102$ | $d_{18} = 0.3800$ | | |
| $r_{19} = 54.9426$ | $d_{19} = 2.8000$ | $n_{10} = 1.69680$ | $v_{10} = 55.52$ |
| $r_{20} = -14.9352$ | $d_{20} = 0.1500$ | | |
| $r_{21} = 31.3077$ | $d_{21} = 2.5000$ | $n_{11} = 1.69680$ | $v_{11} = 55.52$ |
| $r_{22} = -31.3077$ | $d_{22} = 13.1000$ | | |
| $r_{23} = \infty$ | $d_{23} = 1.0000$ | $n_{12} = 1.51633$ | $v_{12} = 64.15$ |
| $r_{24} = \infty$ | $d_{24} = 4.8000$ | $n_{13} = 1.54771$ | $v_{13} = 62.83$ |
| $r_{25} = \infty$ | $d_{25} = 1.0000$ | | |
| $r_{26} = \infty$ | $d_{26} = 0.7000$ | $n_{14} = 1.51633$ | $v_{14} = 64.15$ |
| $r_{27} = \infty$ | $d_{27} = 0.3100$ | | |
| $r_{28} = \infty$ | $d_{28} = 0.6000$ | $n_{15} = 1.48749$ | $v_{15} = 70.20$ |
| $r_{29} = \infty$ | | | |
| f | 9.26989 | 15.63872 | 26.19005 |
| $D_1$ | 1.000 | 8.306 | 13.857 |
| $D_2$ | 0.600 | 2.000 | 0.600 |
| $D_3$ | 14.157 | 5.451 | 1.300 |

$f_B = 19.156$
$|\beta_{2s}| = 0.535$, $D_{43}/f_s = 0.385$
$R_{43}/R_{44} = -0.659$, $(R_{41} + R_{42})/(R_{41} - R_{42}) = -0.663$
$f_{III}/f_s = 2.491$, $D_{42}/f_s = 0.030$
$D_{44}/f_s = 0.024$, $D_{41}/f_s = 0.180$
$(R_{47} + R_{48})/(R_{47} - R_{48}) = 0$, $|\beta_{IV}| = 0.438$

Embodiment 10
f = 9.27 ~ 26.19, F/2.7, 2ω = 18.2° ~ 48.8°

| | | | |
|---|---|---|---|
| $r_1 = 23.6472$ | $d_1 = 1.6000$ | $n_1 = 1.80518$ | $v_1 = 25.43$ |
| $r_2 = 16.7013$ | $d_2 = 0.2800$ | | |
| $r_3 = 17.5352$ | $d_3 = 5.8000$ | $n_2 = 1.69680$ | $v_2 = 55.52$ |
| $r_4 = 907.2892$ | $d_4 = D_1$ | | |
| $r_5 = 120.0459$ | $d_5 = 0.9000$ | $n_3 = 1.80610$ | $v_3 = 40.95$ |
| $r_6 = 9.1514$ | $d_6 = 2.4000$ | | |
| $r_7 = -17.6886$ | $d_7 = 0.9000$ | $n_4 = 1.62374$ | $v_4 = 47.10$ |
| $r_8 = 12.0419$ | $d_8 = 2.1000$ | $n_5 = 1.80518$ | $v_5 = 25.43$ |
| $r_9 = 86.2931$ | | | |
| $r_9 = D_2$ | | | |
| $r_{10} = 36.4059$ | $d_{10} = 1.6000$ | $n_6 = 1.80518$ | $v_6 = 25.43$ |
| $r_{11} = -195.7855$ | $d_{11} = D_3$ | | |
| $r_{12} = \infty$ (stop) | $d_{12} = 1.6000$ | | |
| $r_{13} = 21.5363$ | $d_{13} = 2.8000$ | $n_7 = 1.74950$ | $v_7 = 35.27$ |
| $r_{14} = -21.5363$ | $d_{14} = 0.2800$ | | |
| $r_{15} = -10.8515$ | $d_{15} = 6.2000$ | $n_8 = 1.80518$ | $v_8 = 25.43$ |
| $r_{16} = 28.8749$ | $d_{16} = 0.3200$ | | |
| $r_{17} = 114.8081$ | $d_{17} = 3.1000$ | $n_9 = 1.60311$ | $v_9 = 60.70$ |
| $r_{18} = -12.0037$ | $d_{18} = 0.1500$ | | |
| $r_{19} = 31.5718$ | $d_{19} = 2.7000$ | $n_{10} = 1.60311$ | $v_{10} = 60.70$ |
| $r_{20} = -25.3377$ | $d_{20} = 13.1500$ | | |
| $r_{21} = \infty$ | $d_{21} = 1.0000$ | $n_{11} = 1.51633$ | $v_{11} = 64.15$ |
| $r_{22} = \infty$ | $d_{22} = 4.8000$ | $n_{12} = 1.54771$ | $v_{12} = 62.83$ |
| $r_{23} = \infty$ | $d_{23} = 1.0000$ | | |
| $r_{24} = \infty$ | $d_{24} = 0.7000$ | $n_{13} = 1.51633$ | $v_{13} = 64.15$ |
| $r_{25} = \infty$ | $d_{25} = 0.3100$ | | |
| $r_{26} = \infty$ | $d_{26} = 0.6000$ | $n_{14} = 1.48749$ | $v_{14} = 70.20$ |
| $r_{27} = \infty$ | | | |
| f | 9.27024 | 15.51089 | 26.18990 |
| $D_1$ | 1.000 | 8.701 | 14.811 |
| $D_2$ | 0.600 | 2.000 | 0.600 |
| $D_3$ | 15.111 | 6.010 | 1.300 |

$f_B = 19.210$
$|\beta_{2s}| = 0.517$, $D_{43}/f_s = 0.398$
$R_{43}/R_{44} = -0.376$, $(R_{41} + R_{42})/(R_{41} - R_{42}) = 0$
$f_{III}/f_s = 2.454$, $D_{42}/f_s = 0.018$
$D_{44}/f_s = 0.021$, $D_{41}/f_s = 0.180$
$(R_{47} + R_{48})/(R_{47} - R_{48}) = 0.110$
$|\beta_{IV}| = 0.394$

Embodiment 11
f = 9.27 ~ 26.19, F/2.7, 2ω = 18.2° ~ 48.8°

| | | | |
|---|---|---|---|
| $r_1 = 52.7724$ | $d_1 = 1.6000$ | $n_1 = 1.80518$ | $v_1 = 25.43$ |
| $r_2 = 30.0613$ | $d_2 = 0.7700$ | | |
| $r_3 = 43.9272$ | $d_3 = 3.1300$ | $n_2 = 1.60311$ | $v_2 = 60.70$ |
| $r_4 = -333.8261$ | $d_4 = 0.1500$ | | |
| $r_5 = 20.0380$ | $d_5 = 3.9300$ | $n_3 = 1.60311$ | $v_3 = 60.70$ |
| $r_6 = 118.3378$ | $d_6 = D_1$ | | |
| $r_7 = 78.8559$ | $d_7 = 0.9000$ | $n_4 = 1.80610$ | $v_4 = 40.95$ |
| $r_8 = 8.5856$ | $d_8 = 2.4000$ | | |
| $r_9 = -14.7838$ | $d_9 = 0.9000$ | $n_5 = 1.60311$ | $v_5 = 60.70$ |
| $r_{10} = 14.7838$ | $d_{10} = 0.9000$ | | |
| $r_{11} = 16.4818$ | $d_{11} = 1.9500$ | $n_6 = 1.80518$ | $v_6 = 25.43$ |

-continued

Embodiment 11
$f = 9.27 \sim 26.19$, F/2.7, $2\omega = 18.2° \sim 48.8°$

| | | | |
|---|---|---|---|
| $r_{12} = 69.1500$ | $d_{12} = D_2$ | | |
| $r_{13} = 60.1400$ | $d_{13} = 1.6000$ | $n_7 = 1.80518$ | $\nu_7 = 25.43$ |
| $r_{14} = -76.2375$ | $d_{14} = D_3$ | | |
| $r_{15} = \infty$ (stop) | $d_{15} = 1.6000$ | | |
| $r_{16} = 14.7665$ | $r_{16} = 2.8000$ | $n_8 = 1.66998$ | $\nu_8 = 39.27$ |
| $r_{17} = -24.7859$ | $d_{17} = 0.2400$ | | |
| $r_{18} = -15.4459$ | $d_{18} = 6.0000$ | $n_9 = 1.80518$ | $\nu_9 = 25.43$ |
| $r_{19} = 18.5340$ | $d_{19} = 0.4800$ | | |
| $r_{20} = 57.7994$ | $d_{20} = 3.0000$ | $n_{10} = 1.60311$ | $\nu_{10} = 60.70$ |
| $r_{21} = -15.8058$ | $d_{21} = 0.1500$ | | |
| $r_{22} = 23.1503$ | $d_{22} = 2.8000$ | $n_{11} = 1.60311$ | $\nu_{11} = 60.70$ |
| $r_{23} = -33.8397$ | $d_{23} = 13.1000$ | | |
| $r_{24} = \infty$ | $d_{24} = 1.0000$ | $n_{12} = 1.51633$ | $\nu_{12} = 64.15$ |
| $r_{25} = \infty$ | $d_{25} = 4.8000$ | $n_{13} = 1.54771$ | $\nu_{13} = 62.83$ |
| $r_{26} = \infty$ | $d_{26} = 1.0000$ | | |
| $r_{27} = \infty$ | $d_{27} = 0.7000$ | $n_{14} = 1.51633$ | $\nu_{14} = 64.15$ |
| $r_{28} = \infty$ | $d_{28} = 0.3100$ | | |
| $r_{29} = \infty$ | $d_{29} = 0.6000$ | $n_{15} = 1.48749$ | $\nu_{15} = 70.20$ |
| $r_{30} = \infty$ | | | |

| f | 9.27024 | 15.50218 | 26.18923 |
|---|---|---|---|
| $D_1$ | 1.000 | 7.934 | 13.263 |
| $D_2$ | 1.500 | 2.900 | 1.500 |
| $D_3$ | 13.563 | 5.229 | 1.300 |

$f_B = 19.161$
$|\beta_{2s}| = 0.541$, $D_{43}/f_s = 0.385$
$R_{43}/R_{44} = -0.833$, $(R_{41} + R_{42})/(R_{41} - R_{42}) = -0.253$
$f_{III}/f_s = 2.694$, $D_{42}/f_s = 0.015$
$D_{44}/f_s = 0.031$, $D_{41}/f_s = 0.180$
$(R_{47} + R_{48})/(R_{47} - R_{48}) = -0.188$
$|\beta_{IV}| = 0.459$

Embodiment 12
$f = 9.3 \sim 26.19$, F/2.7, $2\omega = 18.2° \sim 48.8°$

| | | | |
|---|---|---|---|
| $r_1 = 77.7820$ | $d_1 = 1.6000$ | $n_1 = 1.80518$ | $\nu_1 = 25.43$ |
| $r_2 = 37.0785$ | $d_2 = 0.9900$ | | |
| $r_3 = 74.8028$ | $d_3 = 3.00000$ | $n_2 = 1.60311$ | $\nu_2 = 60.70$ |
| $r_4 = -98.6417$ | $d_4 = 0.1500$ | | |
| $r_5 = 20.8090$ | $d_5 = 4.0000$ | $n_3 = 1.60311$ | $\nu_3 = 60.70$ |
| $r_6 = 122.4832$ | $d_6 = D_1$ | | |
| $r_7 = 49.8333$ | $d_7 = 0.9000$ | $n_4 = 1.77250$ | $\nu_4 = 49.66$ |
| $r_8 = 9.8420$ | $d_8 = 2.5000$ | | |
| $r_9 = -16.3061$ | $d_9 = 0.9000$ | $n_5 = 1.60311$ | $\nu_5 = 60.70$ |
| $r_{10} = 43.2092$ | $d_{10} = D_2$ | | |
| $r_{11} = 27.1559$ | $d_{11} = 2.0000$ | $n_6 = 1.84666$ | $\nu_6 = 23.78$ |
| $r_{12} = -41.6930$ | $d_{12} = 0.1700$ | | |
| $r_{13} = -26.1382$ | $d_{13} = 0.9000$ | $n_7 = 1.60311$ | $\nu_7 = 60.70$ |
| $r_{14} = \infty$ | $d_{14} = D_3$ | | |
| $r_{15} = \infty$ (stop) | $d_{15} = 1.6000$ | | |
| $r_{16} = 16.9848$ | $d_{16} = 2.8000$ | $n_8 = 1.72342$ | $\nu_8 = 37.95$ |
| $r_{17} = -32.5010$ | $d_{17} = 0.3600$ | | |
| $r_{18} = -12.3173$ | $d_{18} = 6.2000$ | $n_9 = 1.80518$ | $\nu_9 = 25.43$ |
| $r_{19} = 22.4004$ | $d_{19} = 0.5200$ | | |
| $r_{20} = -927.7583$ | $d_{20} = 2.6000$ | $n_{10} = 1.60311$ | $\nu_{10} = 60.70$ |
| $r_{21} = -12.9126$ | $d_{21} = 0.1500$ | | |
| $r_{22} = 21.1400$ | $d_{22} = 3.2000$ | $n_{11} = 1.60311$ | $\nu_{11} = 60.70$ |
| $r_{23} = -21.1400$ | $d_{23} = 13.1000$ | | |
| $r_{24} = \infty$ | $d_{24} = 1.0000$ | $n_{12} = 1.51633$ | $\nu_{12} = 64.15$ |
| $r_{25} = \infty$ | $d_{25} = 4.8000$ | $n_{13} = 1.54771$ | $\nu_{13} = 62.83$ |
| $r_{26} = \infty$ | $d_{26} = 1.0000$ | | |
| $r_{27} = \infty$ | $d_{27} = 0.7000$ | $n_{14} = 1.51633$ | $\nu_{14} = 64.15$ |
| $r_{28} = \infty$ | $d_{28} = 0.3100$ | | |
| $r_{29} = \infty$ | $d_{29} = 0.6000$ | $n_{15} = 1.48749$ | $\nu_{15} = 70.20$ |
| $r_{30} = \infty$ | | | |

| f | 9.27025 | 15.53620 | 26.18947 |
|---|---|---|---|
| $D_1$ | 1.000 | 8.080 | 13.764 |
| $D_2$ | 0.800 | 2.200 | 0.800 |
| $D_3$ | 14.064 | 5.583 | 1.300 |

$f_B = 19.160$
$|\beta_{2s}| = 0.532$, $D_{43}/f_s = 0.398$
$R_{43}/R_{44} = -0.550$, $(R_{41} + R_{42})/(R_{41} - R_{42}) = -0.314$
$f_{III}/f_s = 2.236$, $D_{42}/f_s = 0.023$
$d_{44}/f_s = 0.033$, $D_{41}/f_s = 0.180$
$(R_{47} + R_{48})/(R_{47} - R_{48}) = 0$, $|\beta_{IV}| = 0.432$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

The Embodiments 1 through 3 have the composition illustrated in FIG. 1 through FIG. 3 respectively wherein the second lens unit consists, in the order from the object side, of a negative lens element, a negative lens element and a positive lens element, the third lens unit consists of a single positive lens element, and the fourth lens unit consists, in the order from the object side, of a positive lens element, a negative lens element, a positive lens element and a positive lens element.

Figure 13:
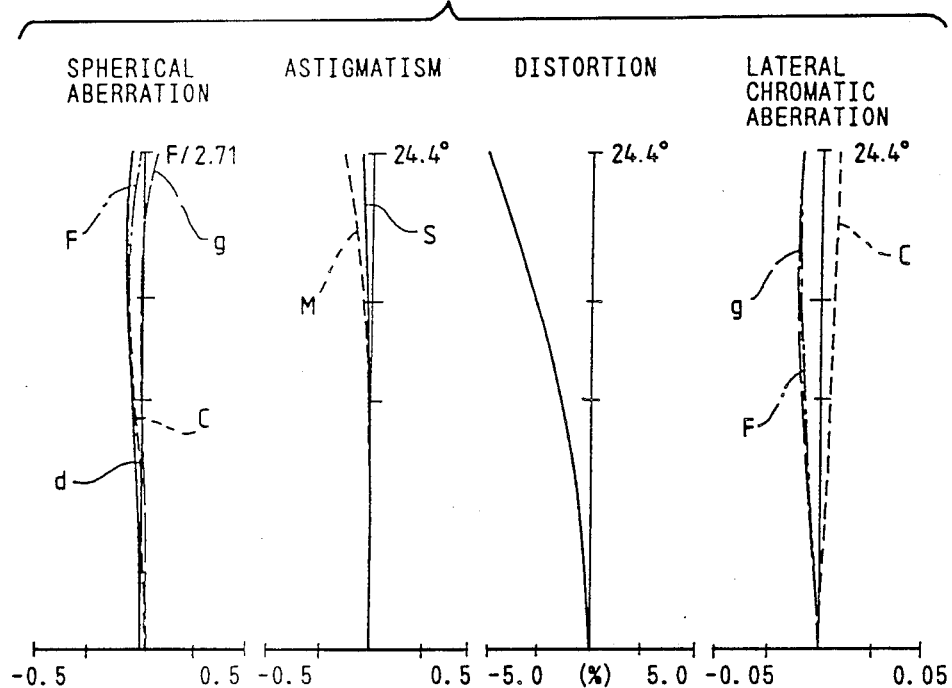
FIG. 13 through FIG. 15 show graphs illustrating aberration characteristics of the Embodiment 1 of the present invention.
Figure 14:
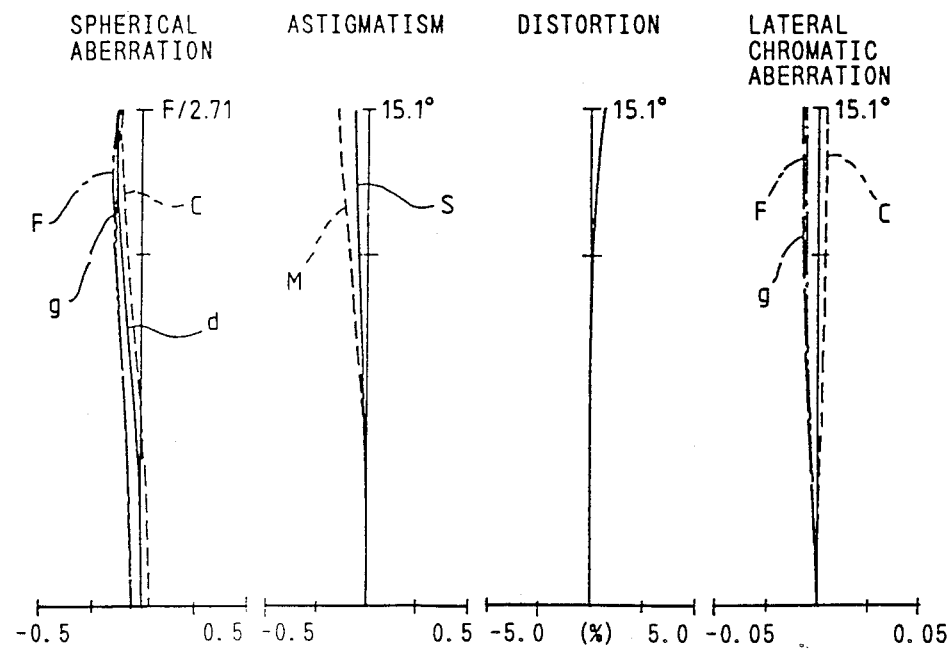
Figure 15:
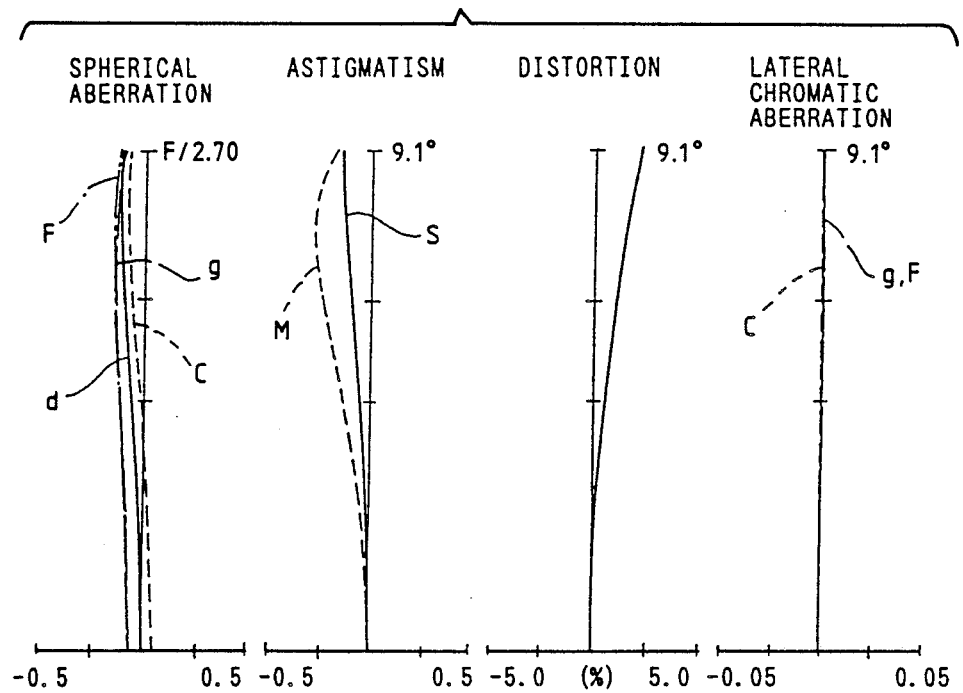
Figure 16:
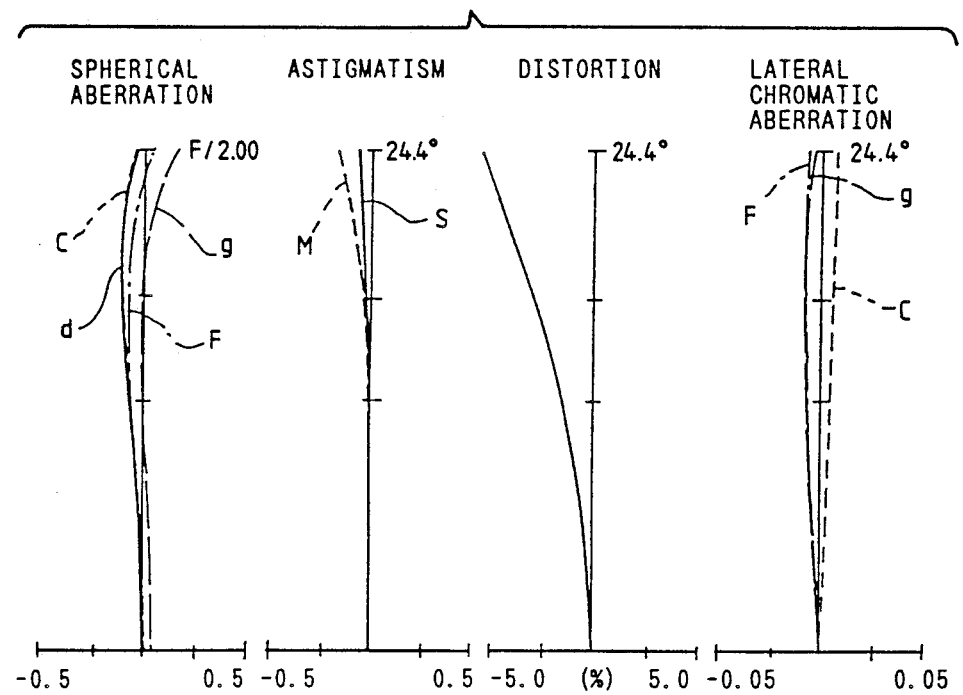
FIG. 16 through FIG. 18 show graphs illustrating aberration characteristics of the Embodiment 2 of the present invention.
Figure 17:
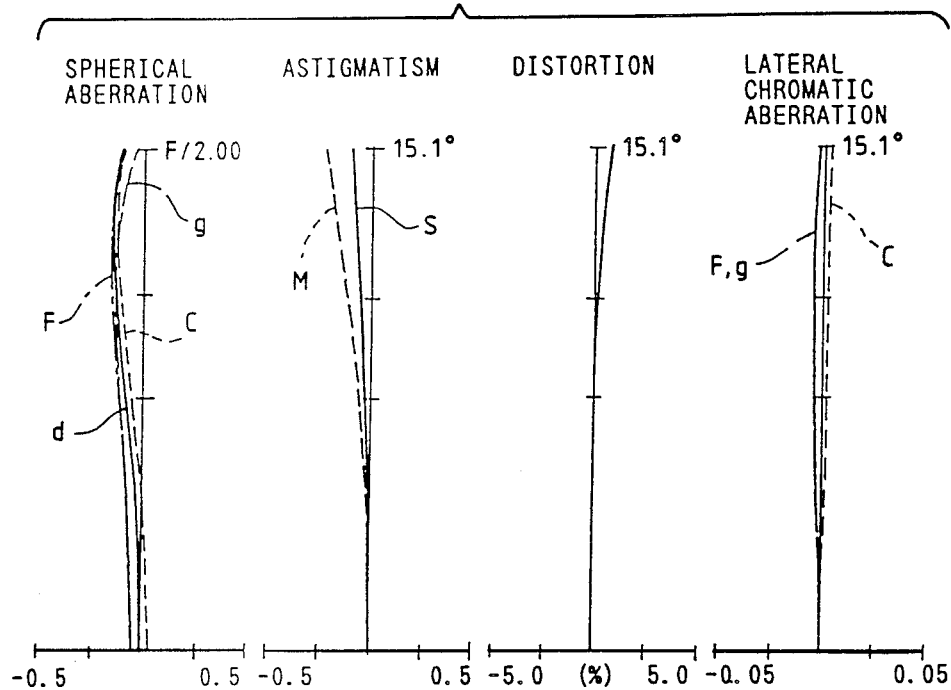
Figure 18:
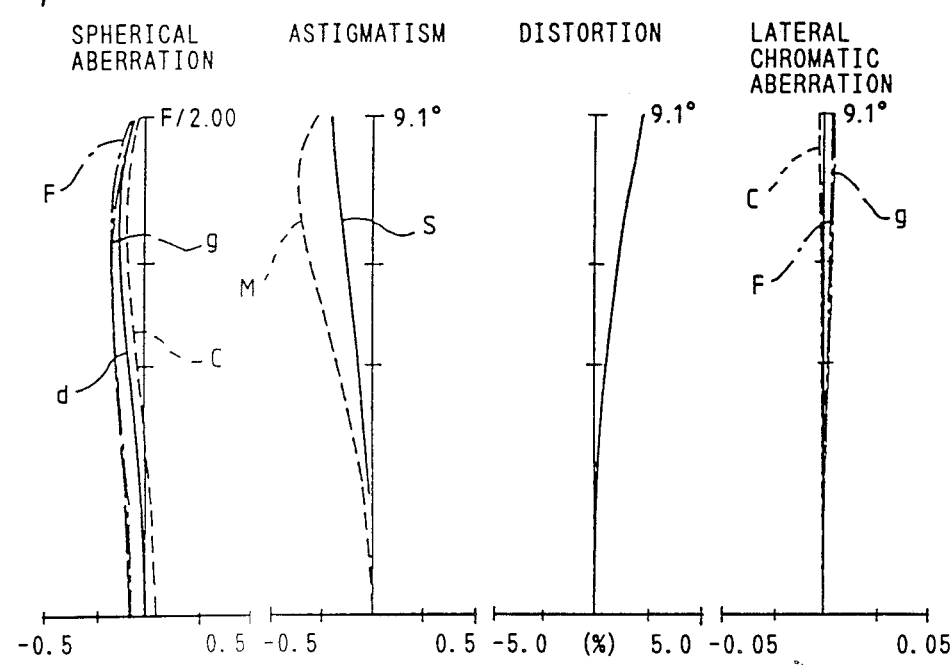
Figure 19:
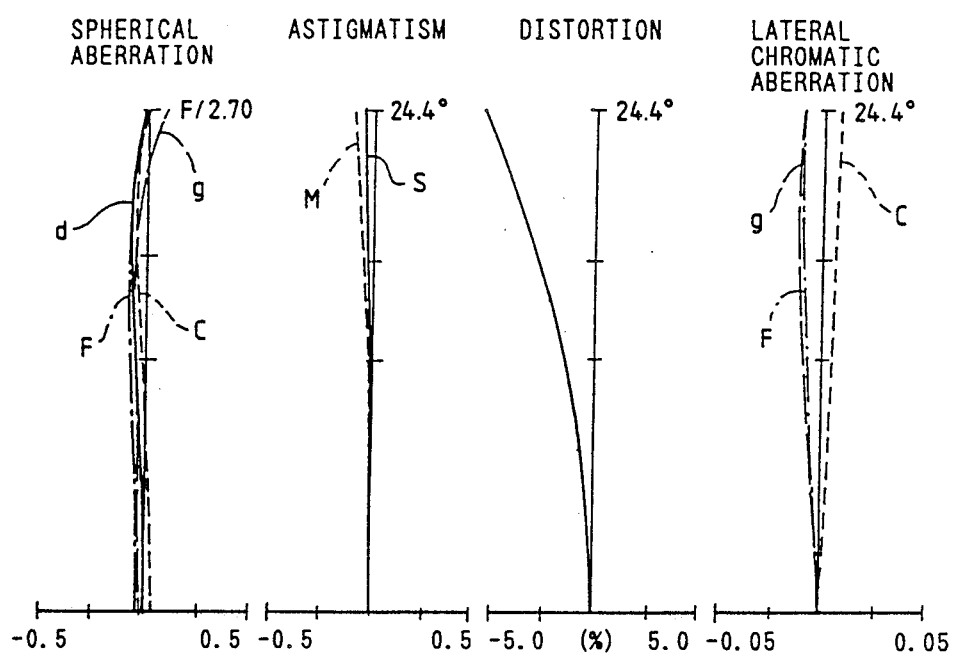
FIG. 19 through FIG. 21 show graphs illustrating aberration characteristics of the Embodiment 3 of the present invention.
Figure 20:
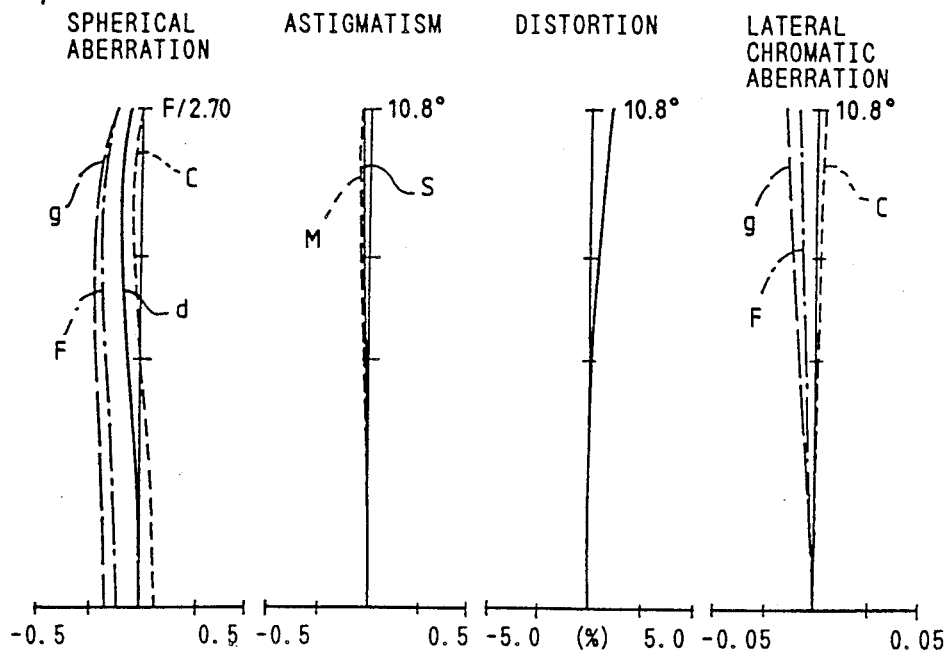
Figure 21:
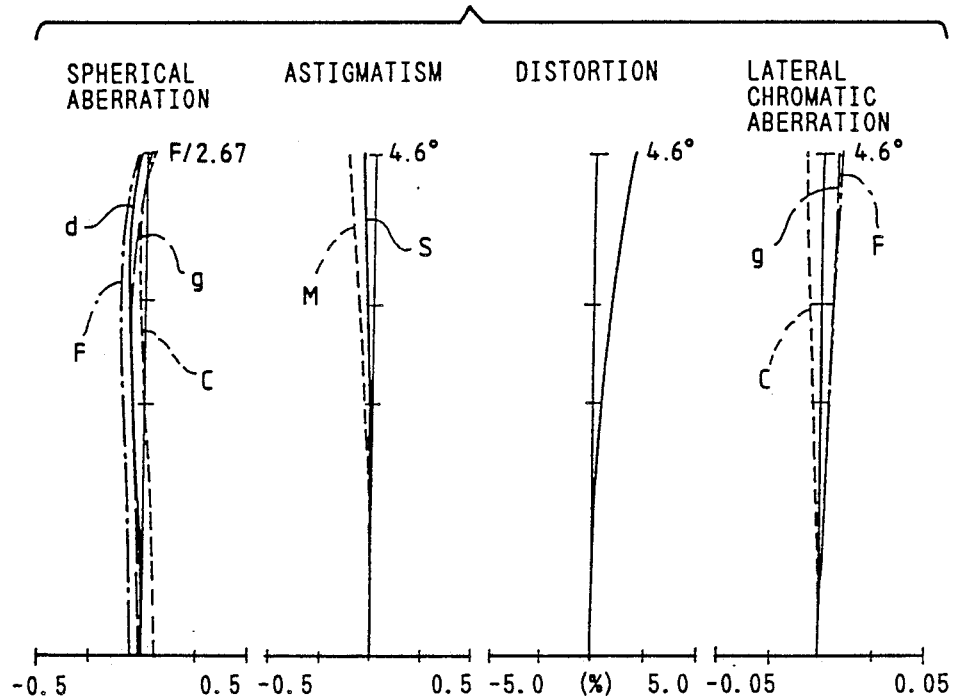

Aberration characteristics at the wide position, intermediate focal length and tele position of the Embodiment 1 are illustrated in FIG. 13, FIG. 14 and Fig. 15 respectively, aberration characteristics at the wide position, intermediate focal length and tele position of the Embodiment 2 are visualized in FIG. 16, FIG. 17 and FIG. 18 respectively, and aberration characteristics at the wide position, intermediate focal length and tele position of the Embodiment 3 are shown in FIG. 19, Fig. 20 and FIG. 21 respectively.

Figure 4:
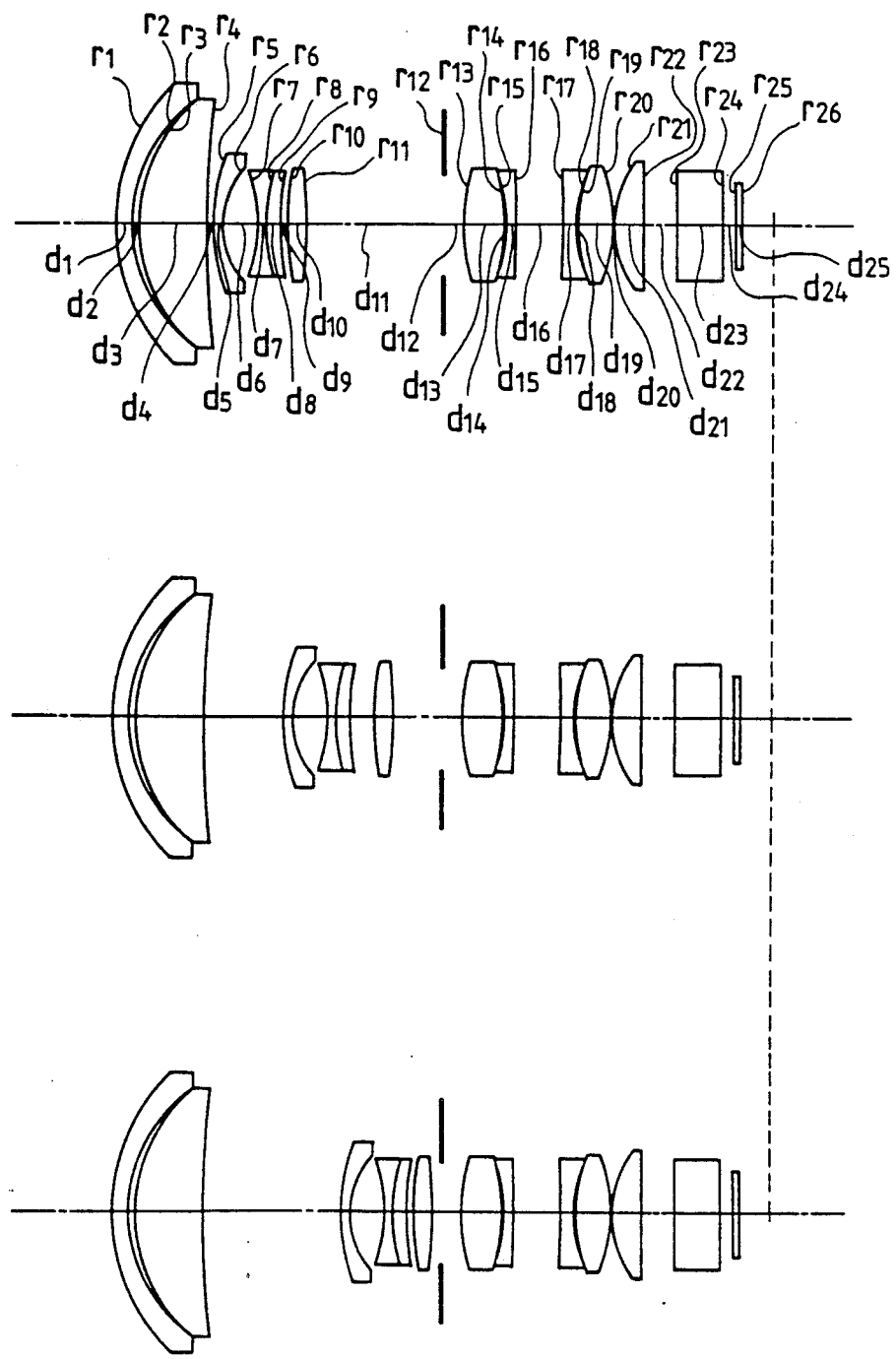

The Embodiment 4 has the composition illustrated in FIG. 4 wherein the second lens unit consists, in the order from the object side, of a negative lens element and a cemented doublet composed of a negative lens element and a positive lens element, the third lens unit consists of a single positive lens element, and the fourth lens unit consists, in the order from the object side, of a positive lens element, a negative lens element, a negative lens element, a positive lens element and a positive lens element.

Figure 22:
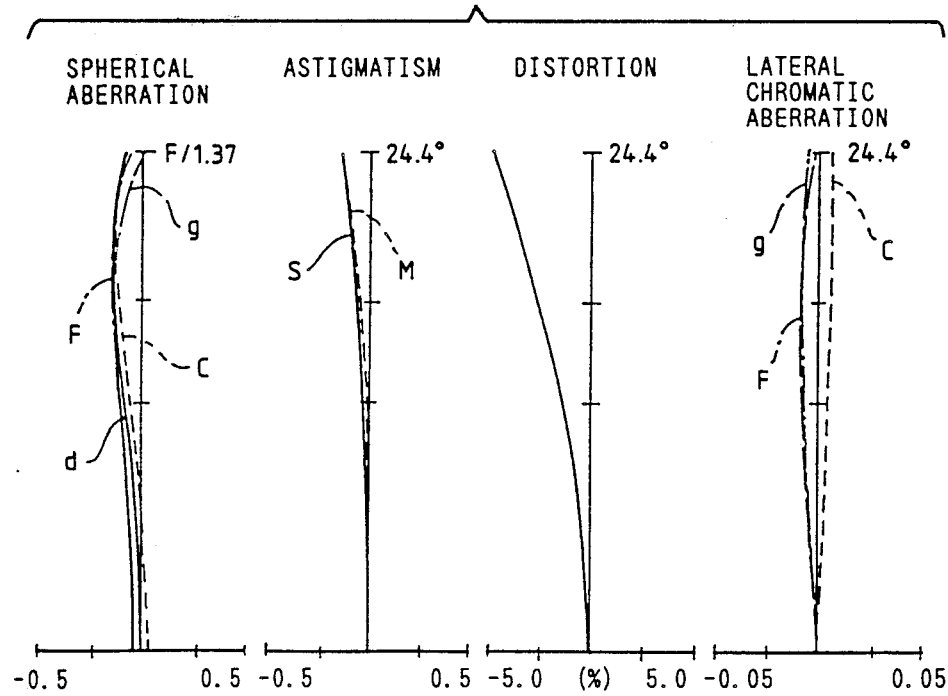
FIG. 22 through FIG. 24 show curves illustrating aberration characteristics of the Embodiment 4 of the present invention.
Figure 23:
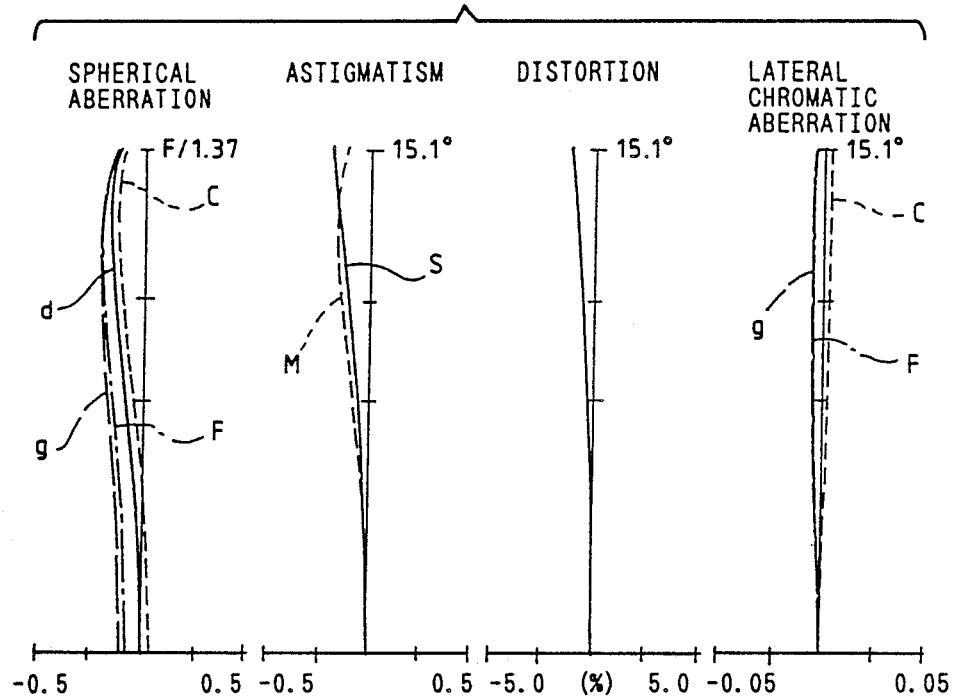
Figure 24:
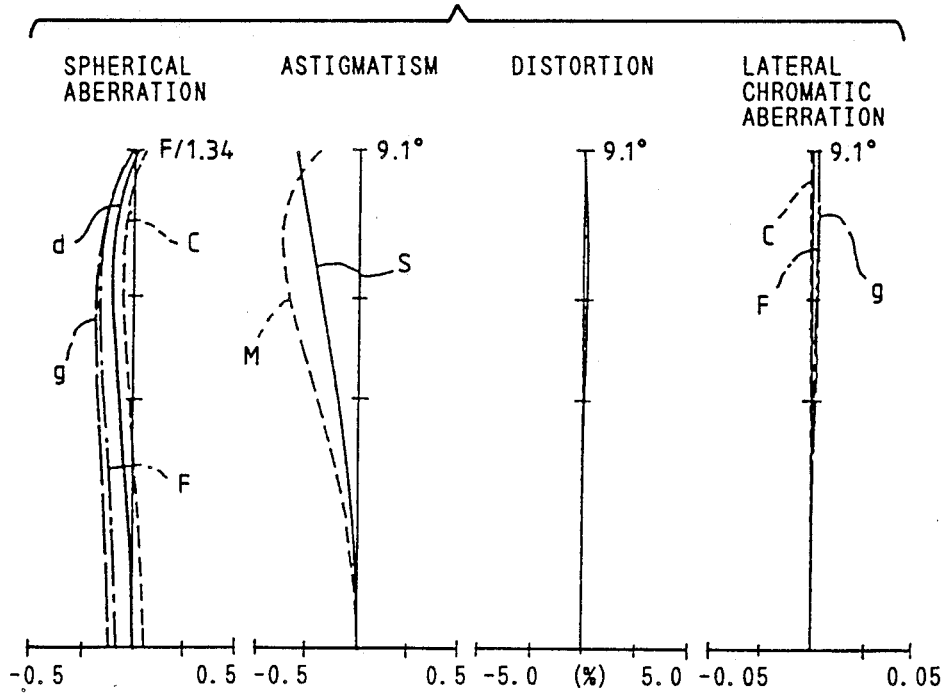

Aberration characteristics at the wide position, intermediate focal length and tele position of the Embodiment 4 are illustrated in FIG. 22, FIG. 23 and Fig. 24 respectively.

Figure 5:
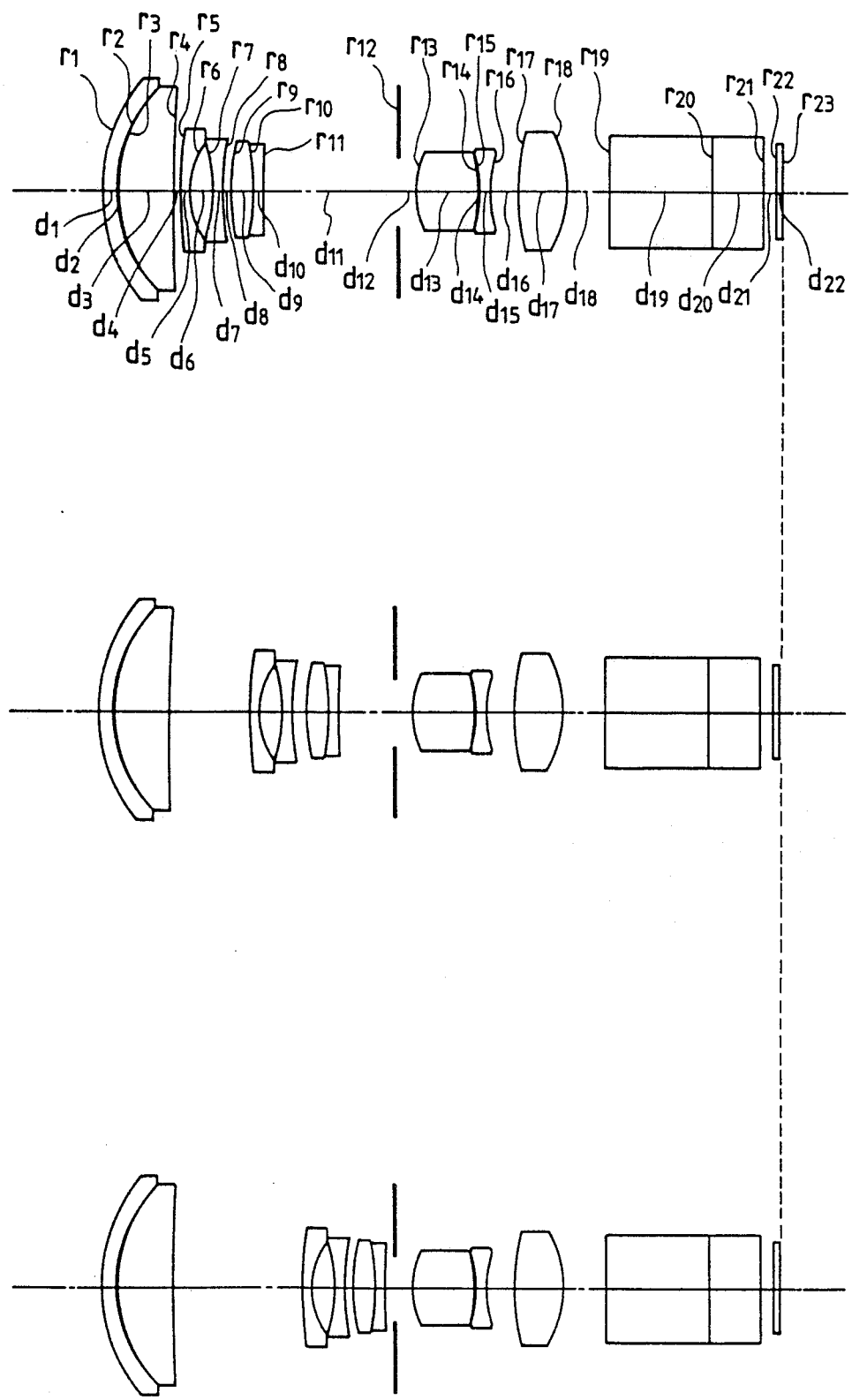

The Embodiment 5 has the composition illustrated in FIG. 5 wherein the second lens unit consists of two negative lens elements, the third lens unit consists of a cemented doublet composed of a positive lens element and a negative lens element, and the fourth lens unit consists, in the order from the object side, of a positive lens element, a negative lens element and a positive lens element.

Figure 25:
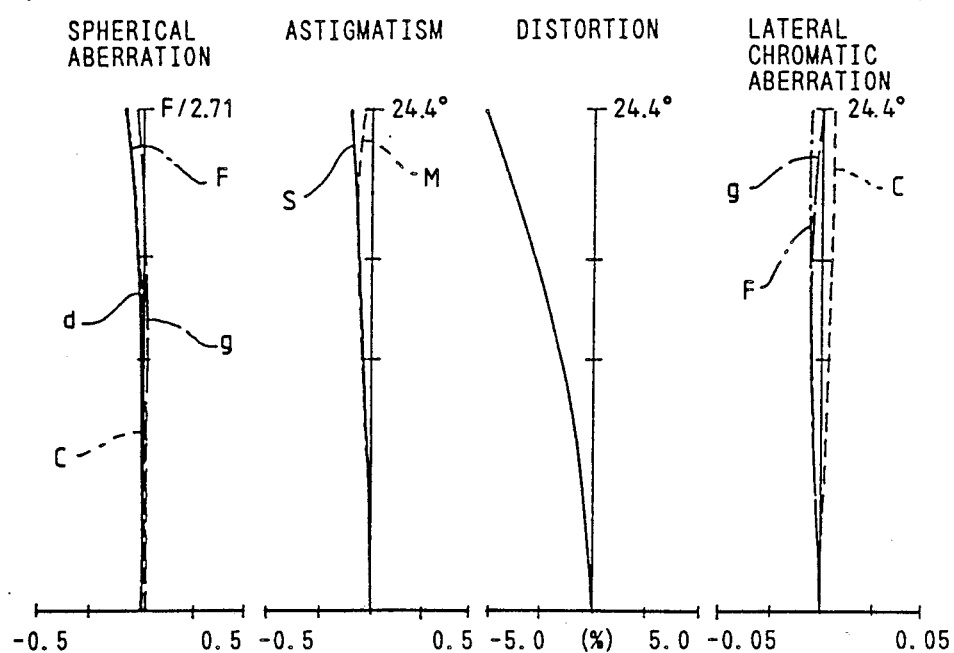
FIG. 25 through FIG. 27 show curves illustrating aberration characteristics of the Embodiment 5 of the present invention.
Figure 26:
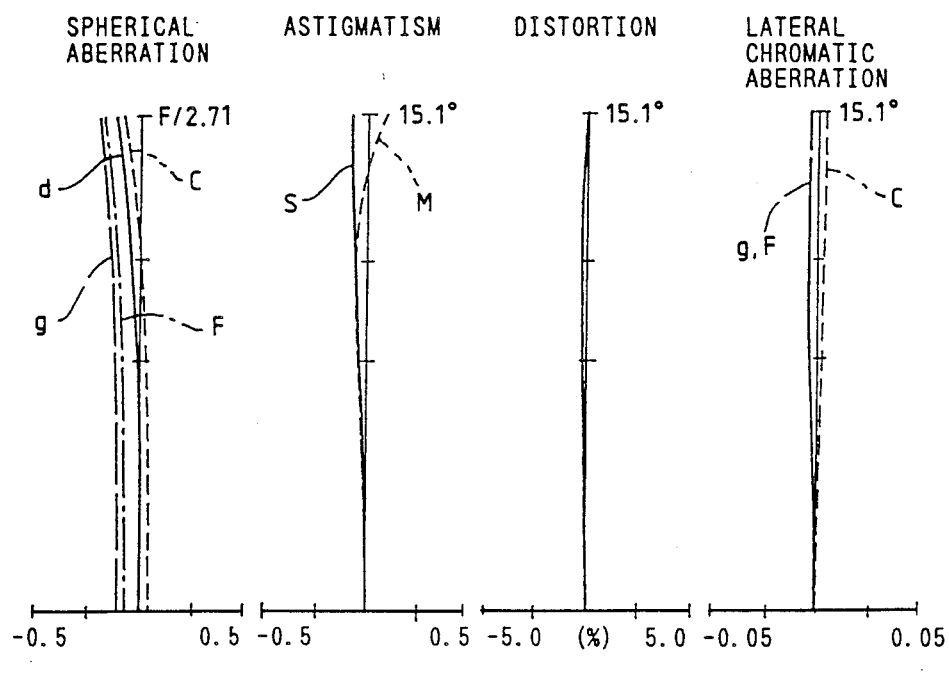
Figure 27:
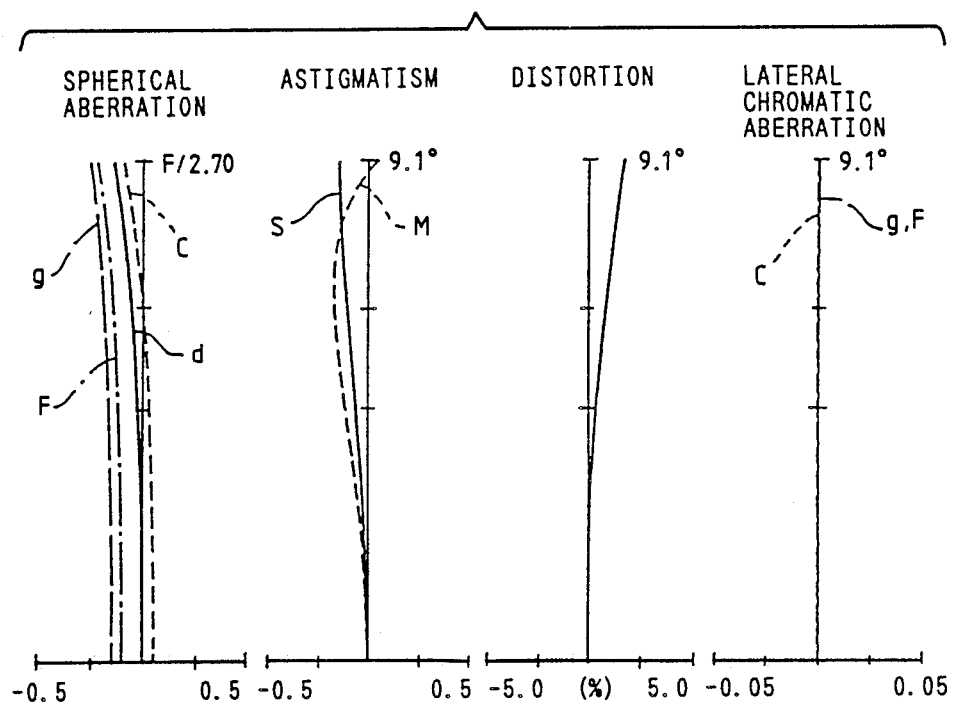

Aberration characteristics at the wide position, intermediate focal length and tele position of the Embodiment 5 are visualized in FIG. 25, FIG. 26 and FIG. 27 respectively.

Figure 6:
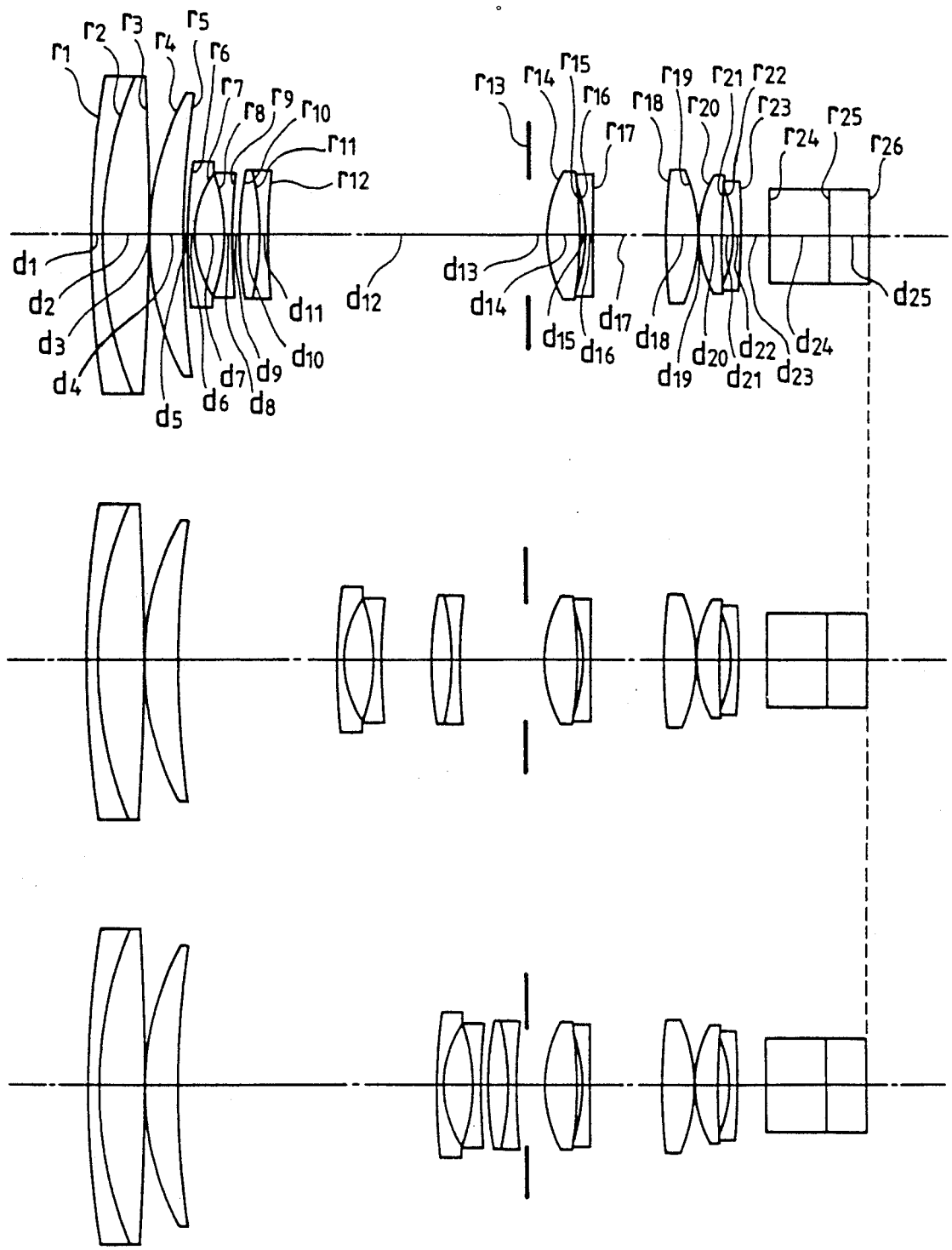
Figure 7:
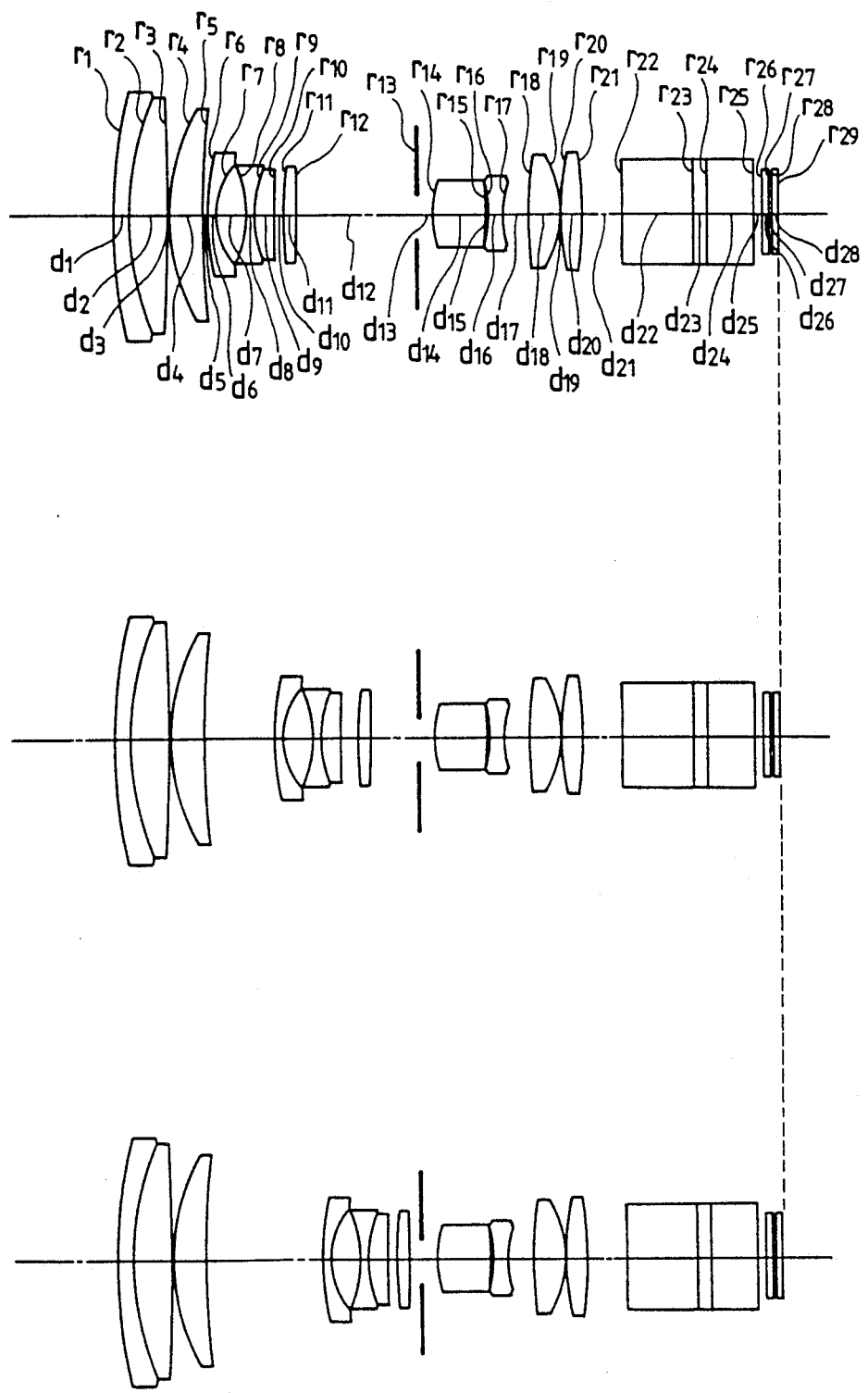
Figure 8:
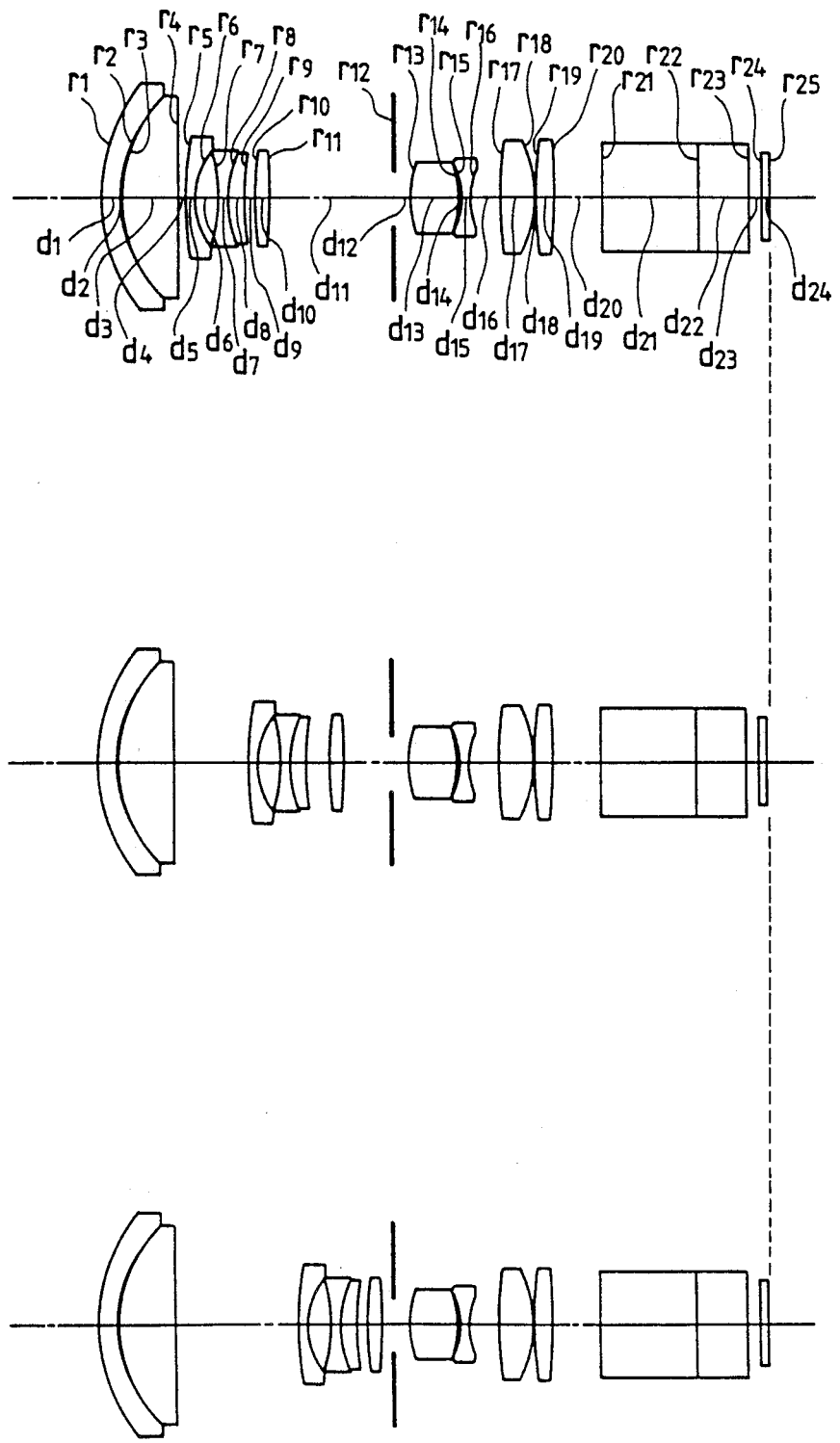
Figure 10:
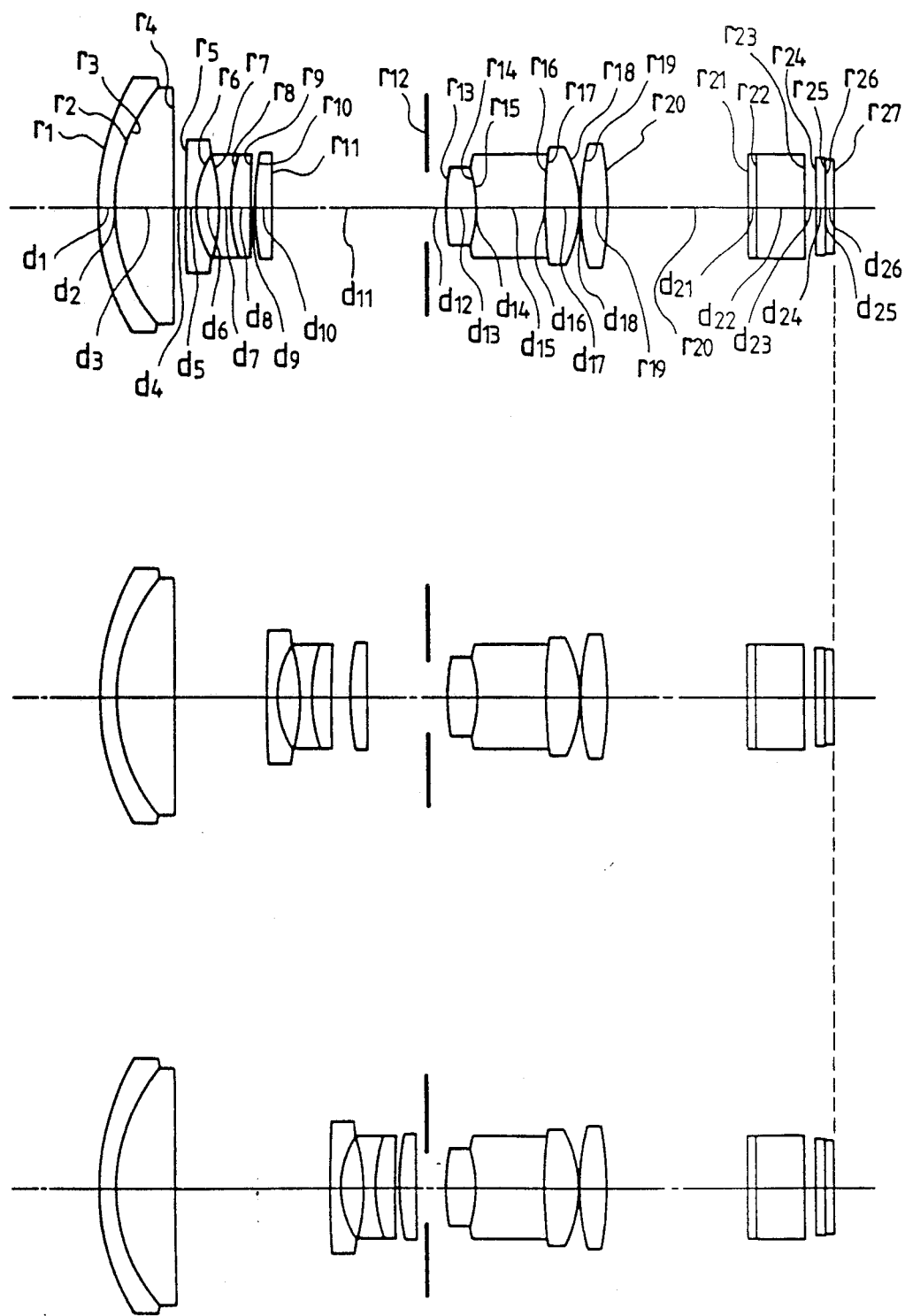

The Embodiment 6 has the composition illustrated in FIG. 6 wherein the second lens unit consists of two negative lens elements, the third lens unit consists of a single cemented doublet composed of a positive lens element and a negative lens element, and the fourth lens unit consists, in the order from the object side, of a positive lens element, a negative lens element, a positive lens element, a positive lens element and a negative lens element.

Figure 28:
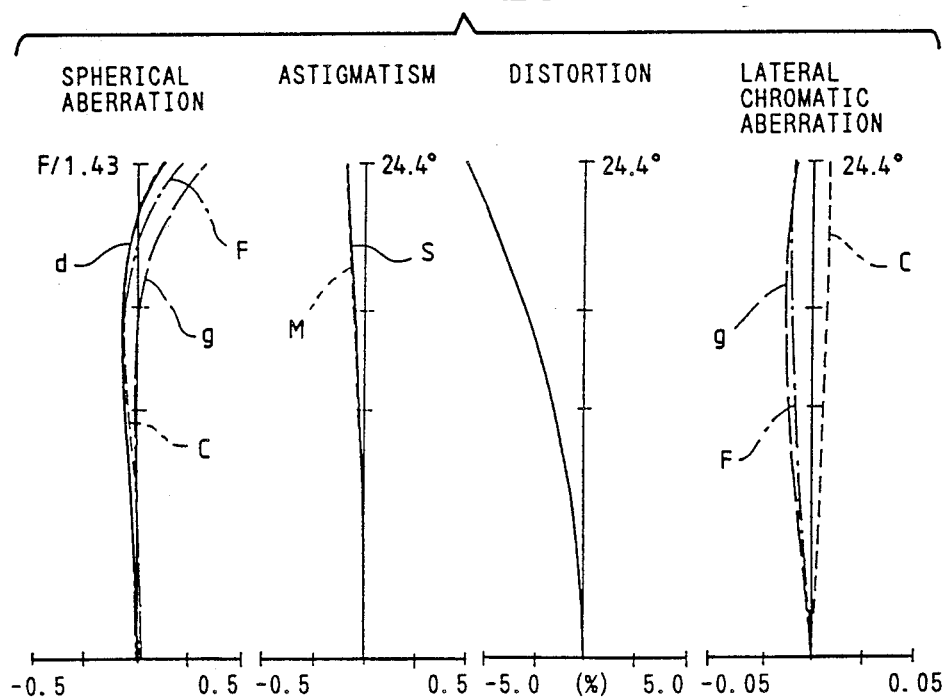
FIG.28 through FIG. 30 show curves illustrating aberration characteristics of the Embodiment 6 of the present invention.
Figure 29:
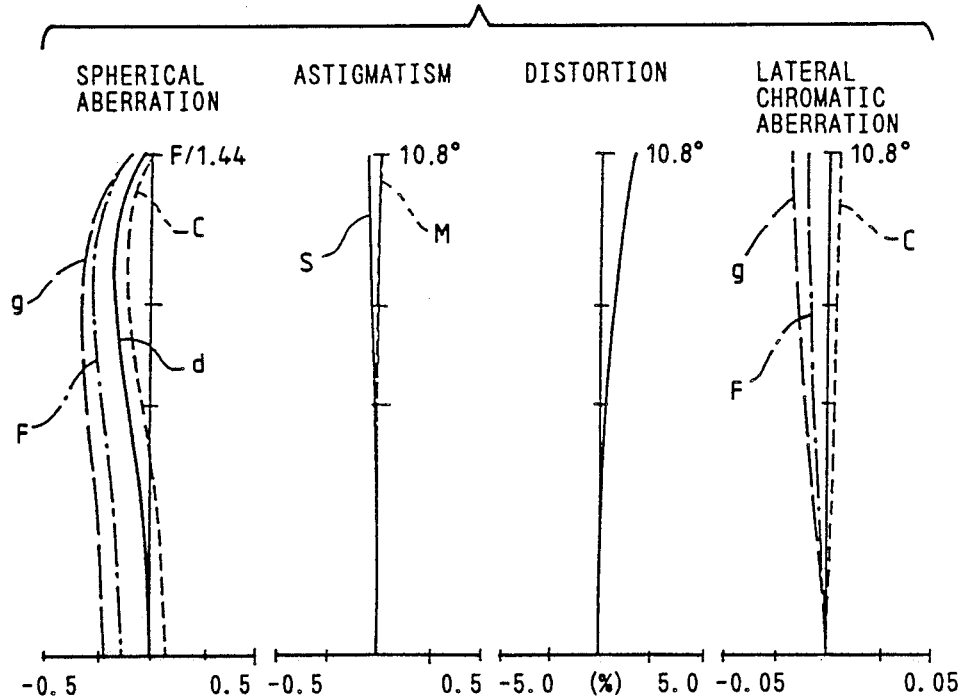
Figure 30:
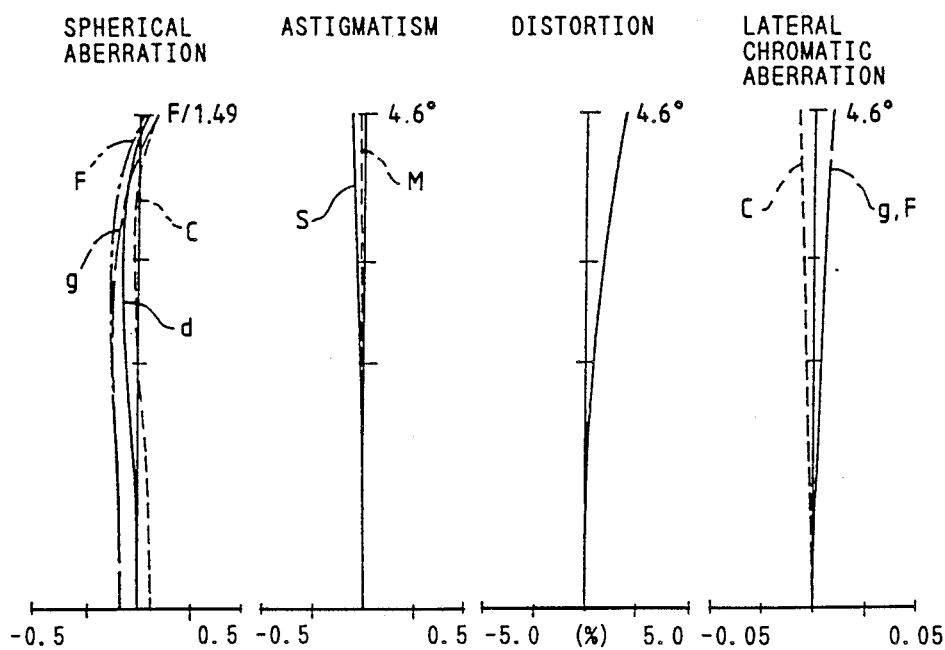

Aberration characteristics at the wide position, intermediate focal length and tele position of the Embodiment 6 are shown in FIG. 28, FIG. 29 and FIG. 30 respectively.

The Embodiments 7 through 10 have the compositions illustrated in FIG. 7 through FIG. 10 respectively in each of which the second lens unit consists, in the order from the object side, of a negative lens element and a cemented doublet composed of a negative lens element and a positive lens element, the third lens unit consists of a single positive lens element, and the fourth lens unit consists, in the order from the object side, of a positive lens element, a negative lens element, a positive lens element and a positive lens element.

Figure 33:
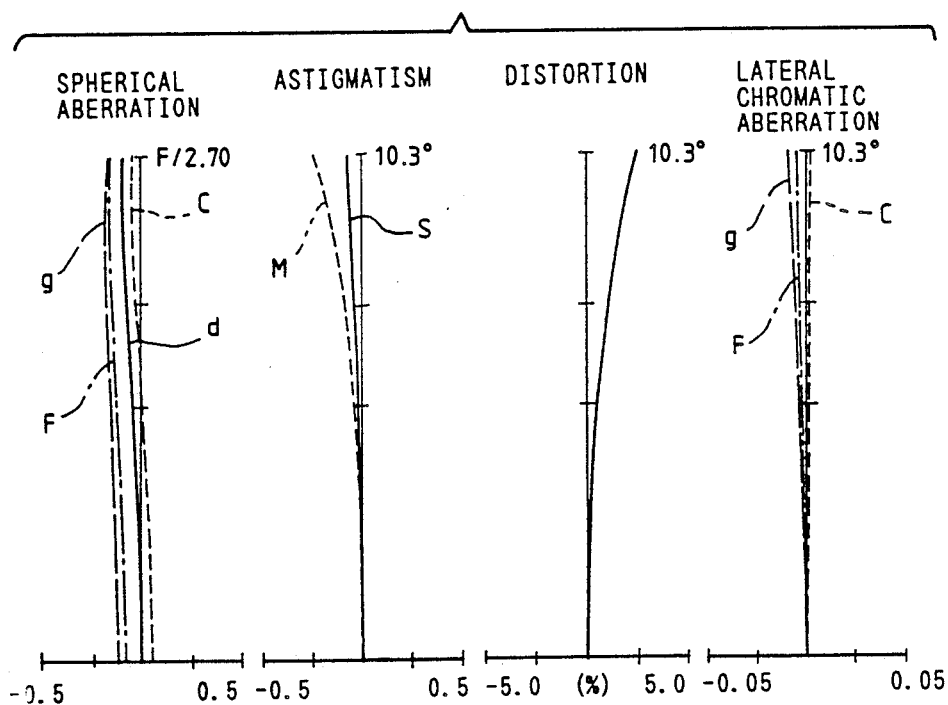
Figure 34:
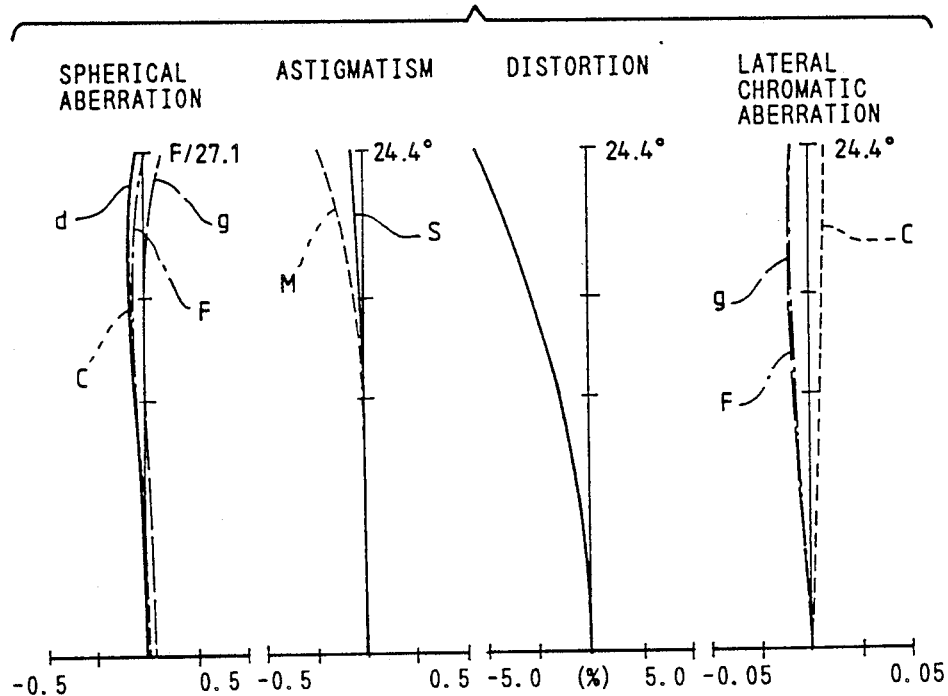
FIG. 34 through FIG. 36 show graphs illustrating aberration characteristics of the Embodiment 8 of the present invention.
Figure 35:
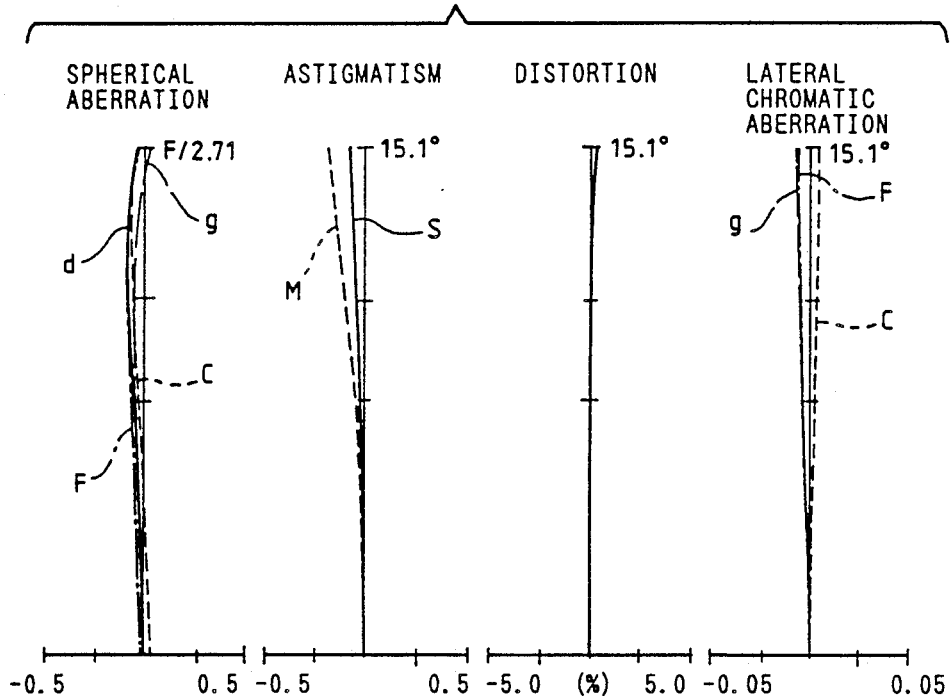
Figure 36:
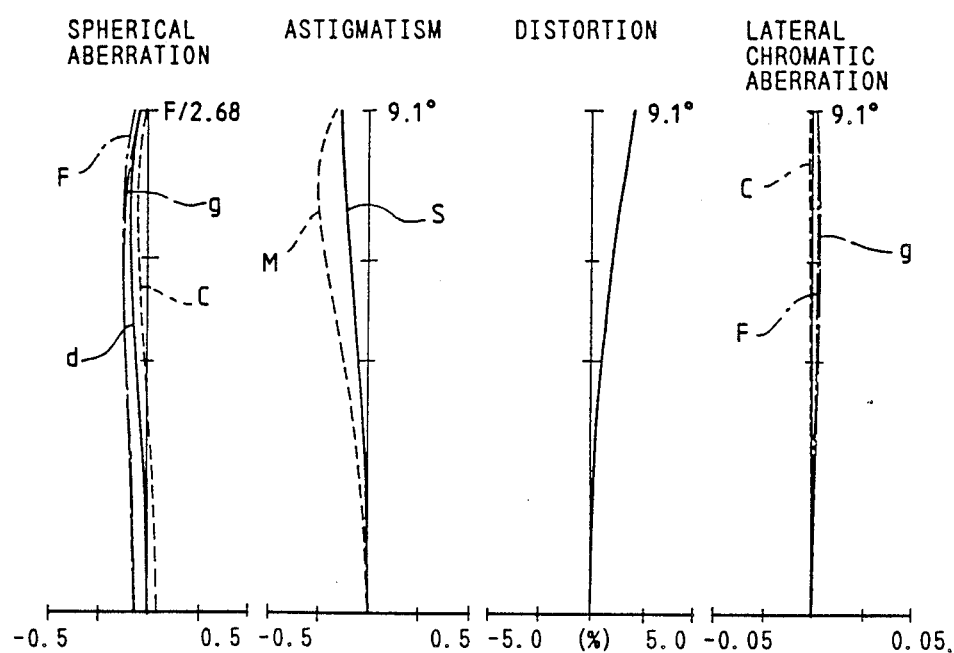
Figure 39:
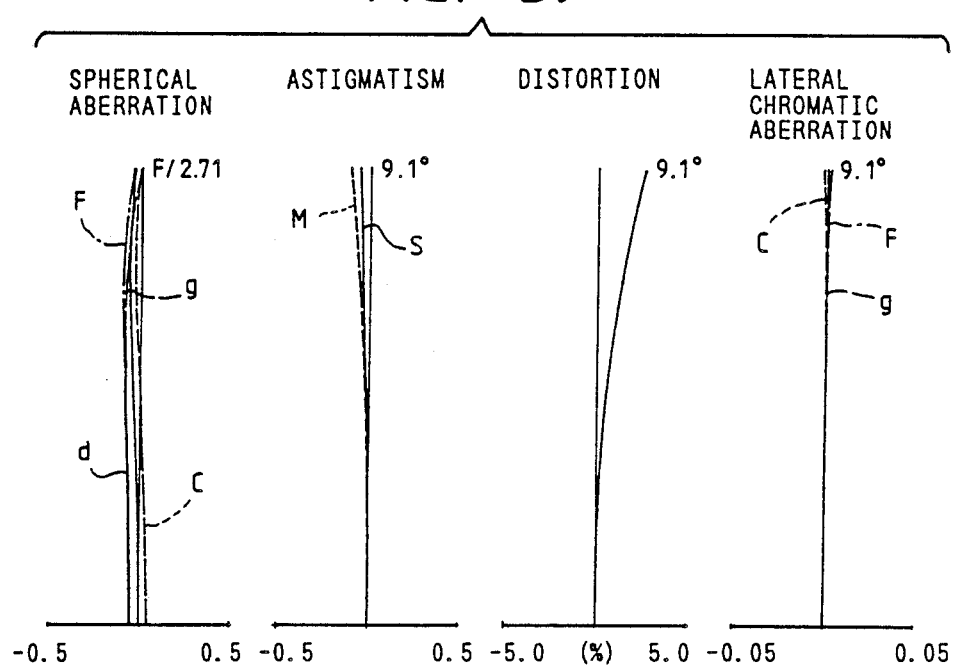
Figure 40:
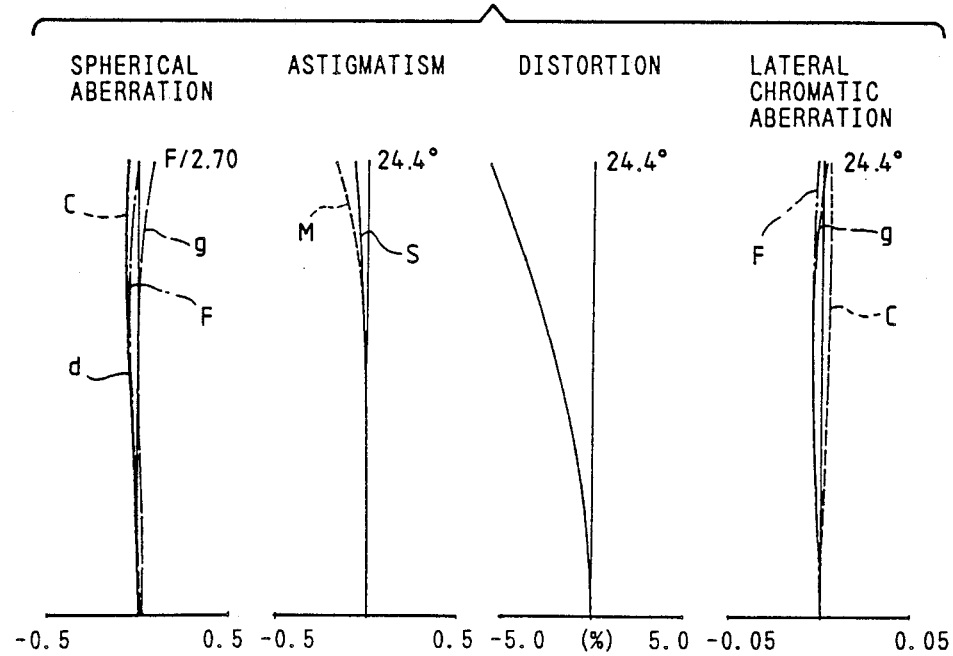
FIG. 40 through FIG. 42 show graphs illustrating aberration characteristics of the Embodiment 10 of the present invention.
Figure 41:
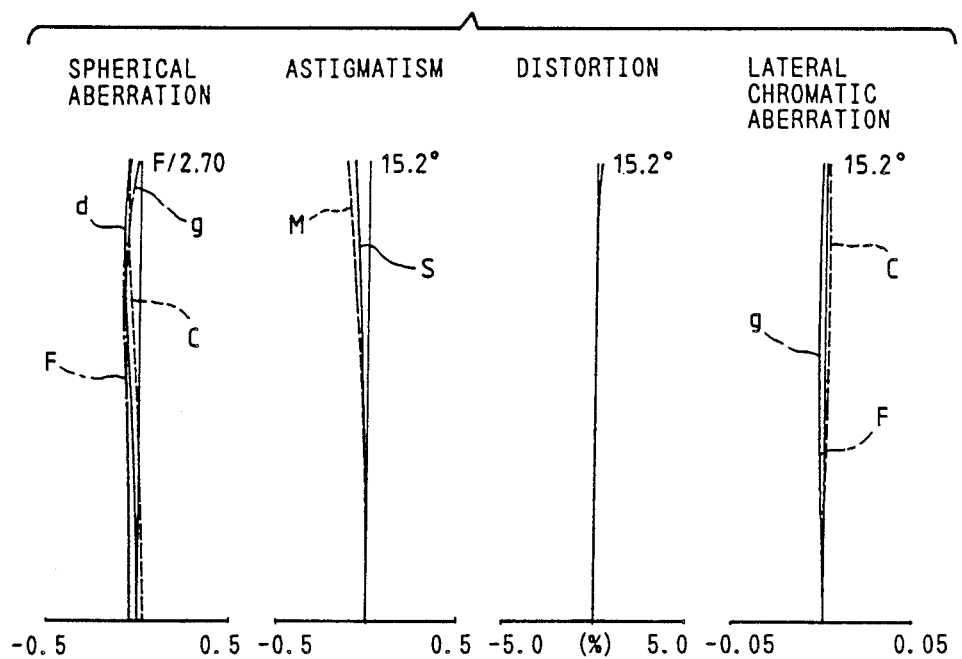
Figure 42:
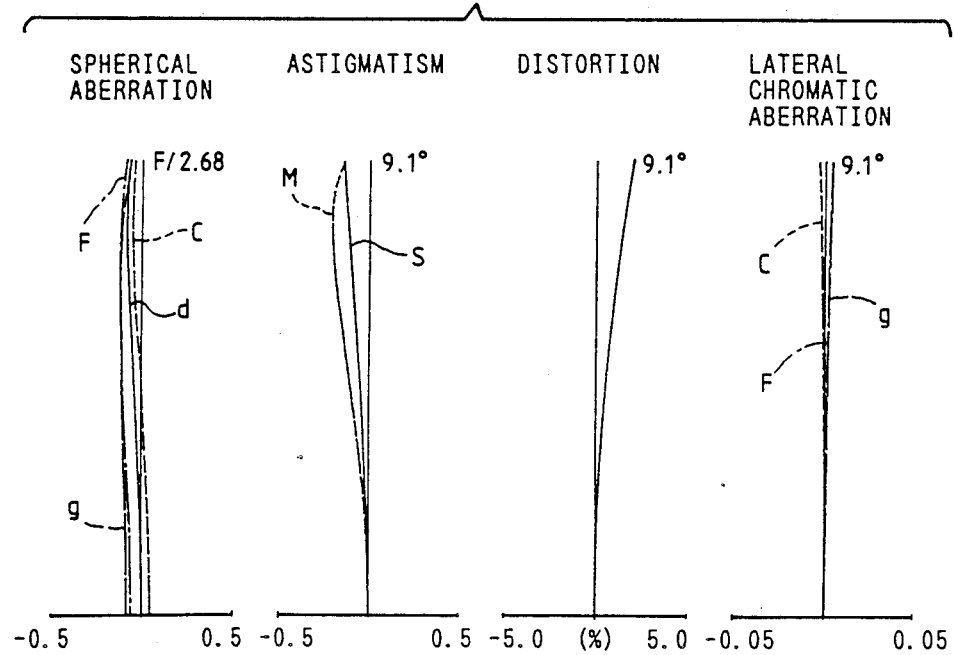

Aberration characteristics at the wide position, intermediate focal length and tele position of the Embodiment 7 are illustrated in FIG. 31, FIG. 32 and Fig. 33 respectively, aberration characteristics at the wide position, intermediate focal length and tele position of the Embodiment 8 are visualized in FIG. 34, FIG. 35 and FIG. 36 respectively, aberration characteristics at the wide position, intermediate focal length and tele position of the Embodiment 9 are shown in FIG. 37, FIG. 38 and FIG. 39 respectively, and aberration characteristics at the wide position, intermediate focal length and tele position of the Embodiment 10 are illustrated in FIG. 40, FIG. 41 and FIG. 42 respectively.

Figure 11:
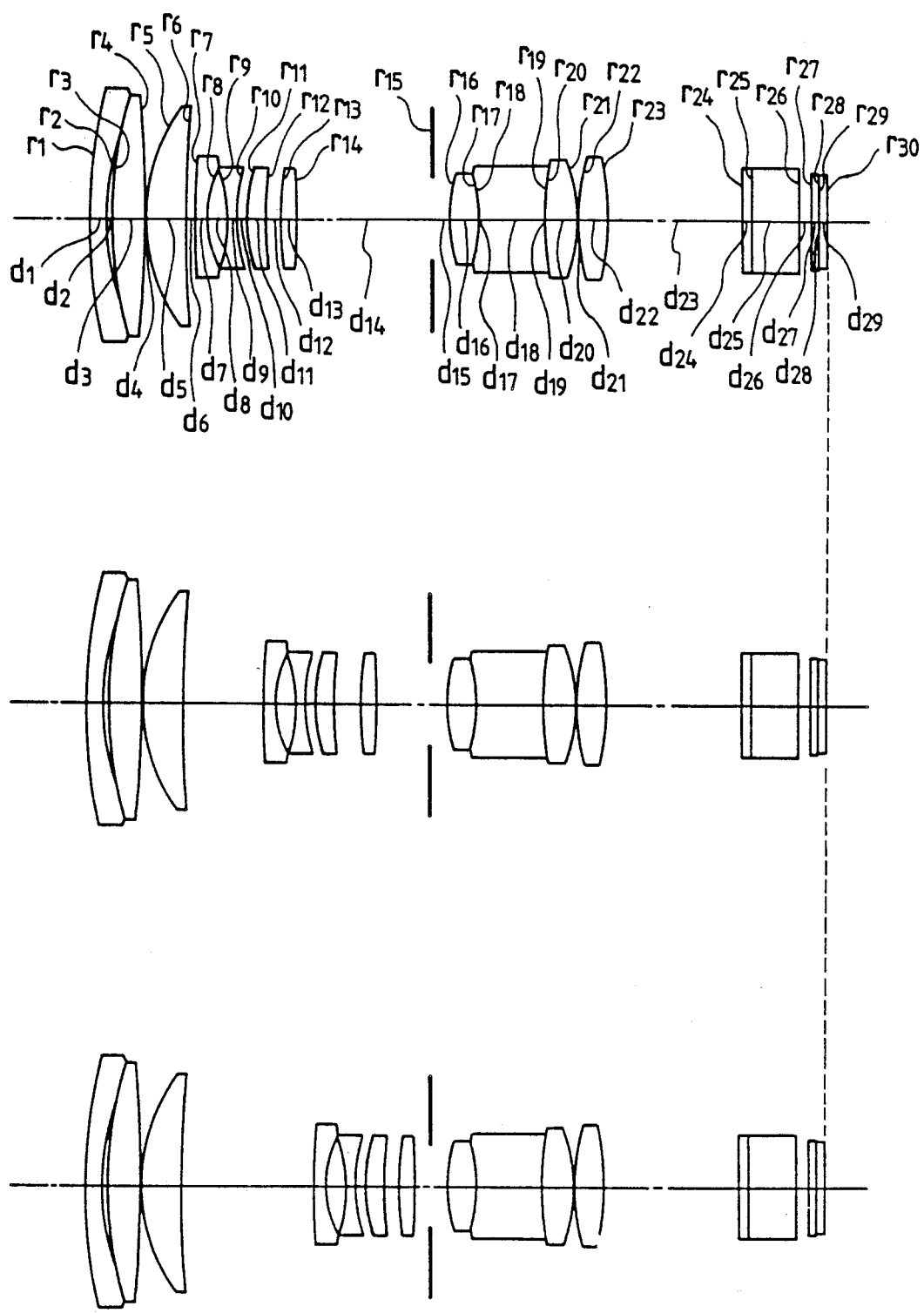

The Embodiment 11 has the composition illustrated in FIG. 11 wherein the second lens unit consists of two negative lens elements and a positive lens element, the third lens unit consists of a single positive lens element, and the fourth lens unit consists, in the order from the object side, of a positive lens element, a negative lens element, a positive lens element and a positive lens element.

Figure 43:
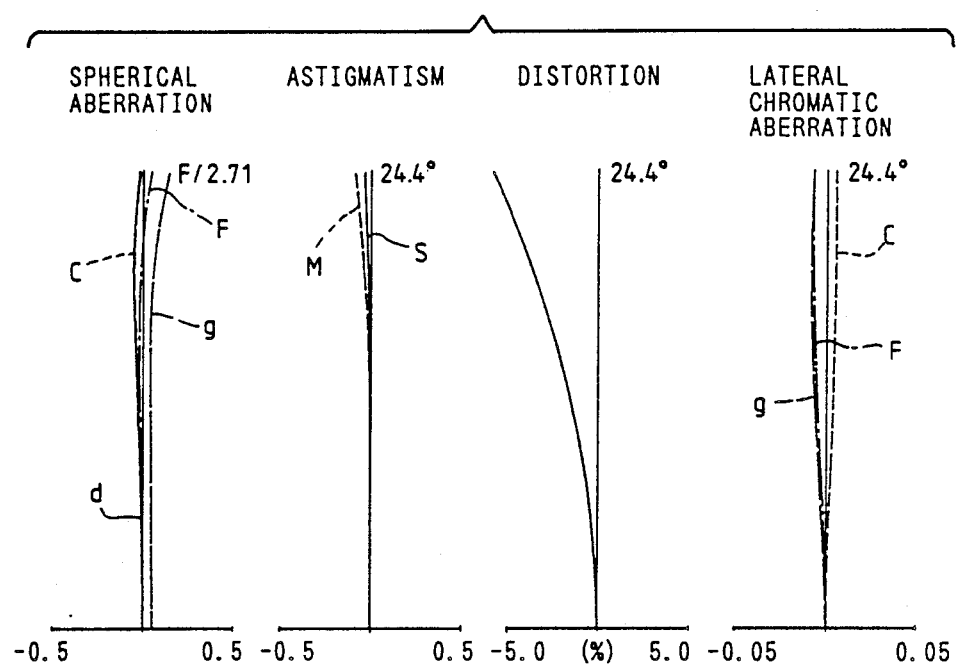
FIG. 43 through FIG. 45 show graphs illustrating aberration characteristics of the Embodiment 11 of the present invention.
Figure 44:
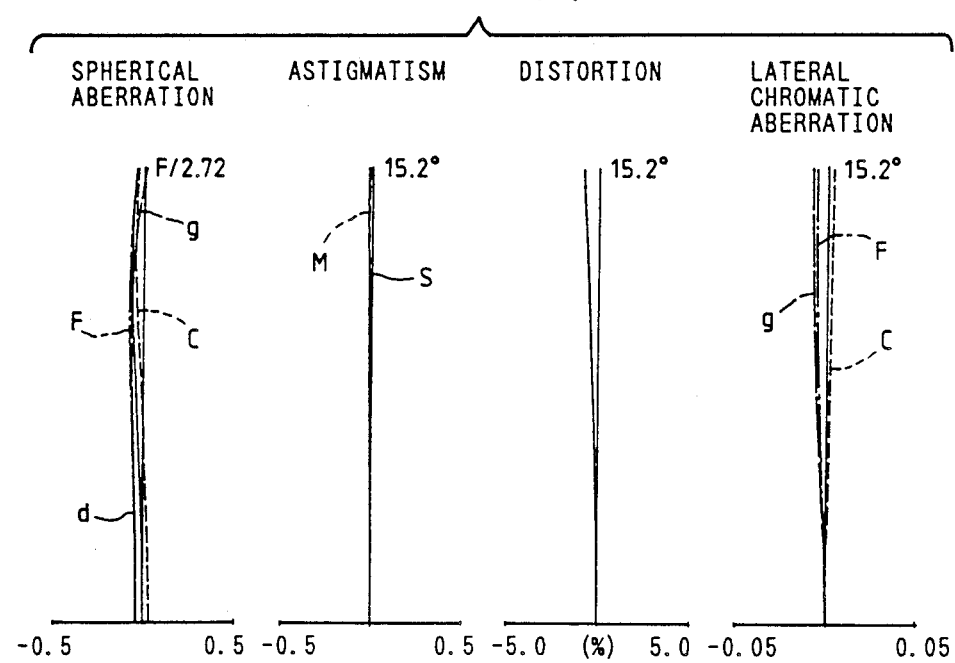
Figure 45:
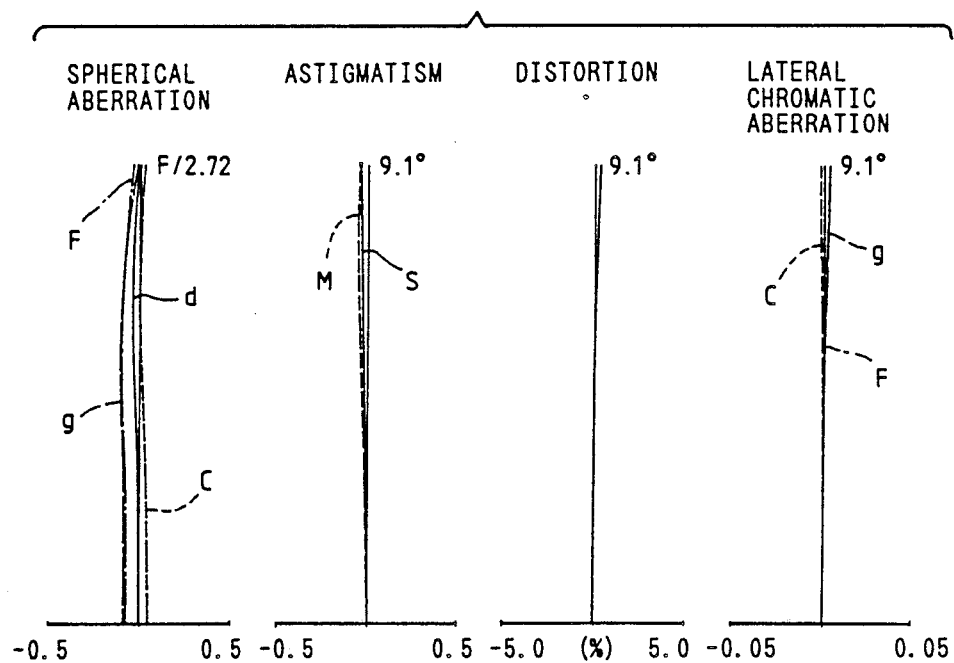

Aberration characteristics at the wide position, intermediate focal length and tele position of the Embodiment 11 are visualized in FIG. 43, FIG. 44 and FIG. 45 respectively.

Figure 12:
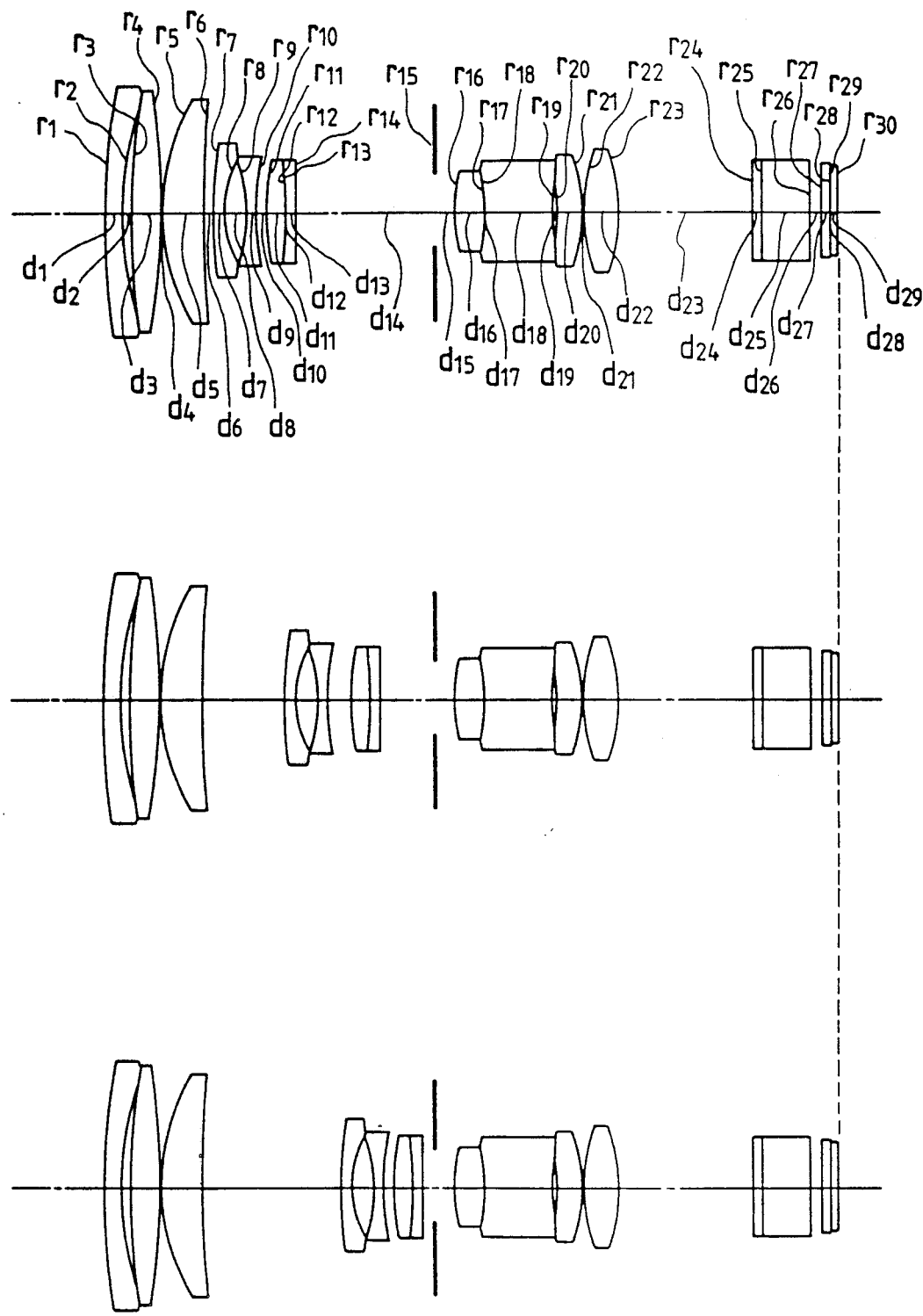

The Embodiment 12 has the composition illustrated in FIG. 12 wherein the second lens unit consists of two negative lens elements, the third lens unit consists, in the order from the object side, of a positive lens element and a negative lens element, and the fourth lens unit consists, in the order from the object side, of a positive lens element, a negative lens element, a positive lens element and a positive lens element.

Figure 46:
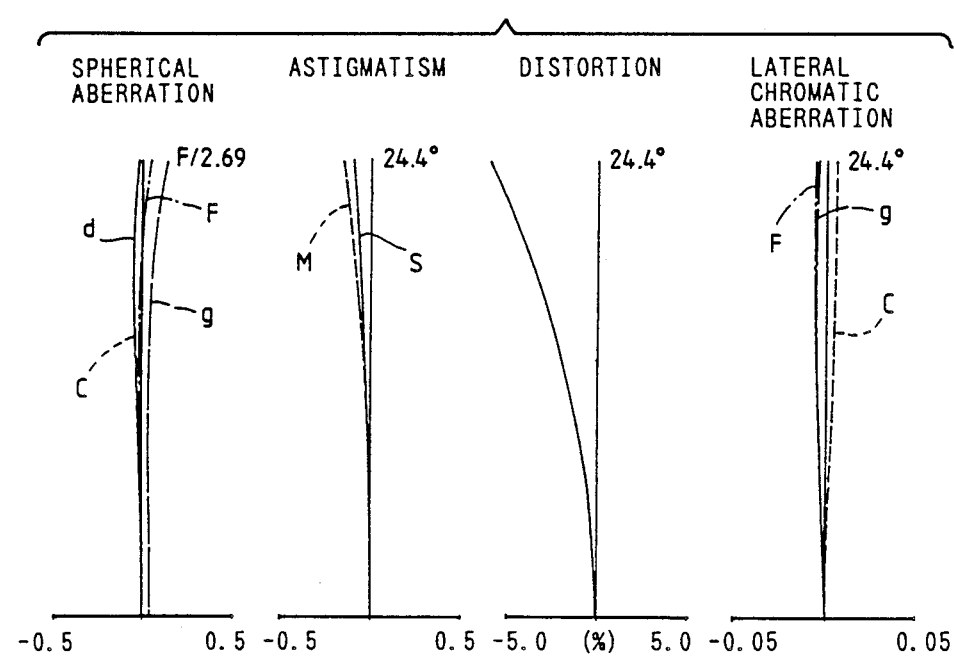
FIG. 46 through FIG. 48 show curves illustrating aberration characteristics of the Embodiment 12 of the present invention.
Figure 47:
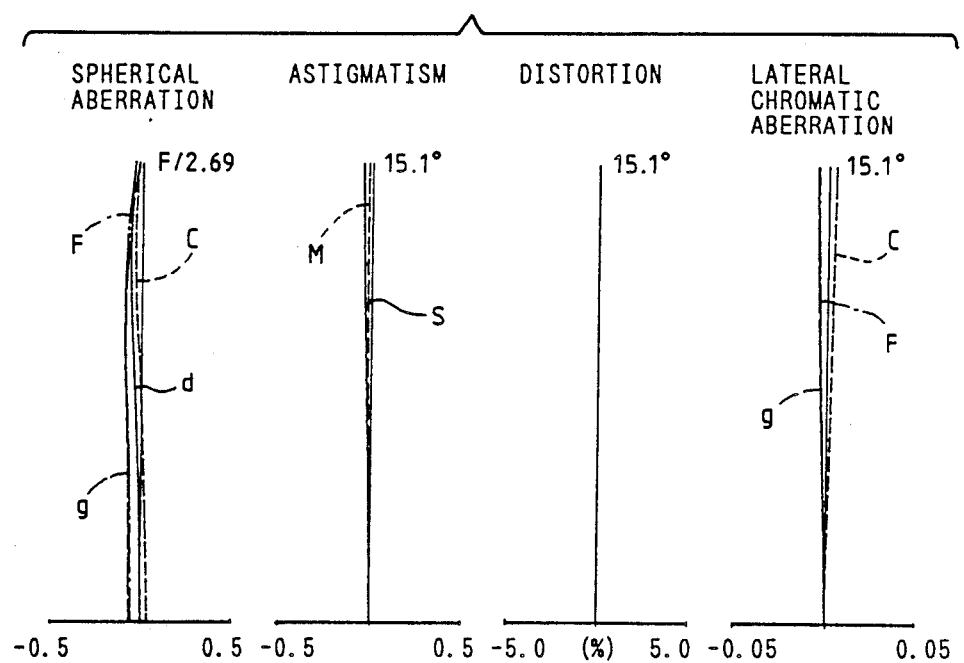
Figure 48:
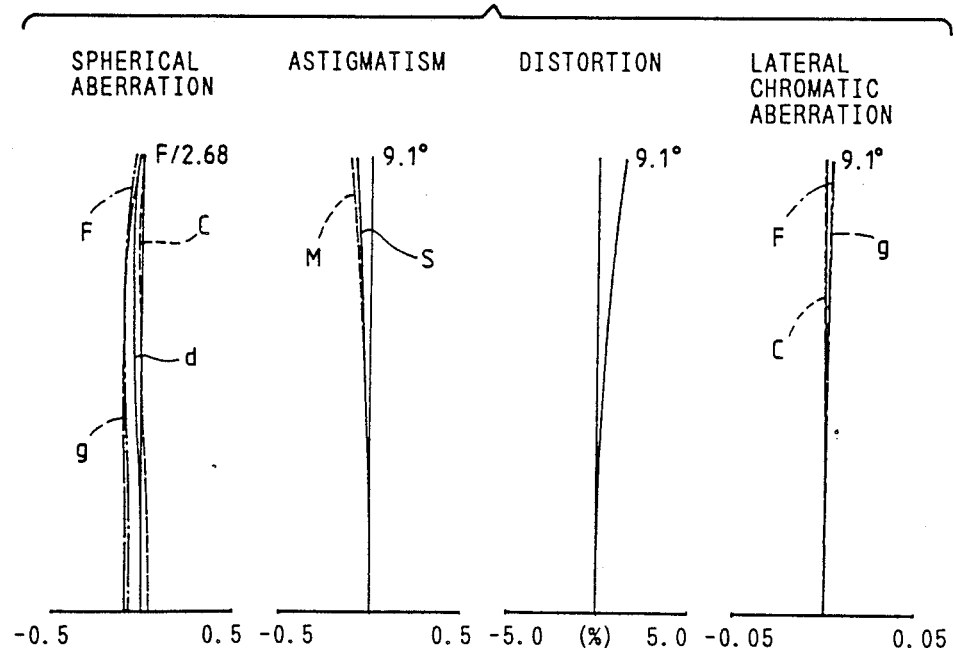

Aberration characteristics at the wide position, intermediate focal length and tele position of the Embodiment 12 are shown in FIG. 46, FIG. 47 and FIG. 48 respectively.

As is understood from the foregoing description, the zoom lens system according to the present invention has a field angle on the order of 49° at the wide position thereof, vari-focal ratios of 3 to 6, F numbers of 1.4 to 2.8, a back focal length at least of 1.2 $f_s$, comprises a small number of lens elements including a front lens having a small diameter, and features favorable imaging performance.

I claim:

1. A zoom lens system comprising, in the order from the object side, a first lens unit having positive refractive power, a second lens unit movable along the optical axis for varying focal length and having negative refractive power, a third lens unit movable along the optical axis for varying focal length and having positive refractive power, and a fourth lens unit kept fixed and having positive refractive power, said second lens unit and said third lens unit consisting of four lens elements in total, and said zoom lens system being so designed as to satisfy the following condition (1):

$$0.2 < |\beta_{2s}\uparrow| < 0.8 \tag{1}$$

wherein the reference symbol $\beta_{2s}$ represents magnification of the second lens unit in a condition where the zoom lens system is set at a focal length of $$f_s = \sqrt{f_w \cdot f_T}$$

(the reference symbols $f_w$ and $f_T$ designate focal lengths of the zoom lens system as a whole at the wide position and the tele position thereof).

2. A zoom lens system according to claim 1 wherein the second lens unit consists, in the order from the object side, of a negative lens element, a negative lens element and a positive lens element, and the third lens unit consists of a single positive lens element.

3. A zoom lens system according to claim 1 wherein the second lens unit consists of two negative lens elements, and the third lens unit consists, in the order from the object side, of a positive lens element and a negative lens element.

4. A zoom lens system comprising, in the order from the object side, a first lens unit having positive refractive power, a second lens unit movable along the optical axis for varying focal length and having negative refractive power, a third lens unit shifted along the optical axis for varying focal length in a locus slightly different from that of the second lens unit and having positive refractive power, and a fourth lens unit kept fixed and having positive refractive power, said second lens unit comprising a positive lens element or said third lens unit comprising a single negative lens element and said zoom lens system being so designed as to satisfy the following conditions (1) through (4):

$$0.2 < |\beta_{2s}| < 0.8 \tag{1}$$

$$1.0 < |f_{II\,III}|/f_w < 2.2 \tag{2}$$

$$\nu_{3p} < 63 \tag{3}$$

$$-0.06 < (D_{2w} - D_{2T})/f_s < 0.16 \tag{4}$$

wherein the reference symbol $\beta_{2s}$ represents magnification of the second lens unit in a condition where the zoom lens system is set at a focal length of $$f_s = \sqrt{f_w \cdot f_T}$$

(the reference symbols $f_w$ and $f_T$ designate focal lengths of the zoom lens system as a whole at the wide position and the tele position respectively), the reference symbol $f_{II\,III}$ denotes total focal length of the second lens unit and the third lens unit at the tele position, the reference symbol $D_{2w}$ represents the airspace reserved between the second lens unit and the third lens unit at the wide position, the reference symbol $D_{2T}$ designates the airspace reserved between the second lens unit and the third lens unit at the tele position, and the reference symbol $\nu_{3p}$ denotes Abbe's number of the positive lens element arranged in the third lens unit.

5. A zoom lens system comprising, in the order from the object side, a first lens unit having positive refractive power, a second lens unit movable along the optical axis for varying focal length and having negative refractive power, a third lens unit movable along the optical axis for varying focal length and having positive refractive power, and a fourth lens unit having positive refractive power, said fourth lens unit comprising at least two diverging surfaces and said zoom lens system being so designed as to satisfy the following conditions:

$$|\beta_{2s}| < 0.8$$

$$0.08 < D/f_s < 1.2 \qquad (6)$$

wherein the reference symbol $f_s$ represents a geometrical mean of the focal length of the zoom lens system as a whole at the wide position thereof and the focal length of the zoom lens system as a whole at the tele position thereof, the reference symbol $\beta_{2s}$ designates magnification of the second lens unit in a condition where the zoom lens system is set at the focal length of $f_s$, and the reference symbol D denotes distance between the surface having the strongest diverging power and the surface having the second strongest diverging power in the fourth lens unit.

6. A zoom lens system according to claim 5 wherein the fourth lens unit comprises, in the order from the object side, a positive lens component comprising at least one positive lens element and consisting only of positive lens elements, a negative lens component comprising at least one negative lens element and consisting only of negative lens elements, and a positive lens component comprising at least one positive lens element, the extremely object side surface of said negative lens component being designed as the surface having the strongest diverging power and the extremely image side surface of said negative lens component being designed as the surface having the second strongest diverging power.

7. A zoom lens system comprising, in the order from the object side, a first lens unit having positive refractive power, a second lens unit movable along the optical axis for varying focal length and having negative refractive power, a third lens unit movable along the optical axis for varying focal length and having positive refractive power, and a fourth lens unit having positive refractive power, said fourth lens unit comprising, in the order from the object side, a positive lens component comprising at least one positive lens element and consisting only of positive lens elements,, a biconcave lens element, and a positive lens component comprising at least one positive lens element and consisting only of positive lens elements, and said zoom lens system being so designed as to satisfy the following conditions:

$$|\beta_{2s}| < 0.8$$

$$0.08 < D_N/f_s < 1.2 \qquad (7)$$

wherein the reference symbol $f_s$ represents a geometrical mean of the focal length of the zoom lens system as a whole at the wide position thereof and the focal length of the zoom lens system as a whole at the tele position thereof, the reference symbol $\beta_{2s}$ designates magnification of the second lens unit in a condition where the zoom lens system is set at the focal length of $f_s$, and the reference symbol $D_N$ denotes thickness of said biconcave lens element.

8. A zoom lens system comprising, in the order from the object side, a first lens unit having positive refractive power, a second lens unit movable along the optical axis for varying focal length and having negative refractive power, a third lens unit movable along the optical axis for varying focal length and having positive refractive power, and a fourth lens unit having positive refractive power, said fourth lens unit comprising, in the order from the object side, a biconvex lens element, a biconcave lens element and two positive lens elements, and said zoom lens system being so designed as to satisfy the following conditions:

$$|\beta_{2s}| < 0.8$$

$$0.08 < D_{4\,3}/f_s < 1.2 \qquad (8)$$

wherein the reference symbol $f_s$ represents a geometrical means of the focal length of the zoom lens system as a whole at the wide position thereof and the focal length of the zoom lens system as a whole at the tele position thereof, the reference symbol $\beta_{2s}$ designates magnification of the second lens unit in a condition where the zoom lens system is set at the focal length of $f_s$, and the reference symbol $D_{4\,3}$ denotes thickness of said biconcave lens element.

* * * * *